(12) United States Patent
Chen et al.

(10) Patent No.: US 12,695,706 B2
(45) Date of Patent: Jul. 28, 2026

(54) NETWORK TRANSMISSION METHODS AND RELATED DEVICE THEREOF

(71) Applicant: Huawei Technologies Co., Ltd., Shenzhen (CN)

(72) Inventors: Lihao Chen, Beijing (CN); Konstantinos Alexandris, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 64 days.

(21) Appl. No.: 18/937,840

(22) Filed: Nov. 5, 2024

(65) Prior Publication Data

US 2025/0062997 A1     Feb. 20, 2025

Related U.S. Application Data

(63) Continuation of application No. PCT/CN2023/082973, filed on Mar. 22, 2023.

(30) Foreign Application Priority Data

May 7, 2022     (CN) .......................... 202210493373.1

(51) Int. Cl.
*H04L 47/283*     (2022.01)
*H04L 43/12*     (2022.01)
(52) U.S. Cl.
CPC ............ *H04L 47/283* (2013.01); *H04L 43/12* (2013.01)
(58) Field of Classification Search
None
See application file for complete search history.

(56) References Cited

FOREIGN PATENT DOCUMENTS

EP         3958509 A1      2/2022
WO     WO-2021013338 A1 *  1/2021  ............. H04L 65/65
WO     WO-2021174236 A2 *  9/2021  ........... H04L 47/805
(Continued)

OTHER PUBLICATIONS

IEEE Std 802.1Q™-2018 (Revision of IEEE Std 802.1Q-2014) IEEE Standard for Local and Metropolitan Area Networks-Bridges and Bridged Networks, LAN/MAN Standards Committee of the IEEE Computer Society,May 7, 2018, IEEE-SA Standards Board, total 1993 pages.

(Continued)

*Primary Examiner* — Natisha D Cox
(74) *Attorney, Agent, or Firm* — Slater Matsil, LLP

(57)     ABSTRACT

This application discloses network transmission methods and a related device. The method includes: A first network device determines a first planned latency based on a traffic characteristic of a data flow, where the first planned latency is a maximum latency for transmitting the data flow in a first network domain; updates a first accumulated latency based on the first planned latency, where the first accumulated latency is a maximum accumulated latency of the data flow from a source node to a destination node in TSN; and when the first accumulated latency is not greater than a target latency, sends a first message to a second network device, where the first message includes the first accumulated latency, the target latency is a needed latency of the data flow from the source node to the destination node in the TSN.

20 Claims, 9 Drawing Sheets

(56)           References Cited

FOREIGN PATENT DOCUMENTS

WO       WO-2022225577 A1 * 10/2022   .......... H04L 47/801

OTHER PUBLICATIONS

IEEE Std 802.1Qcc™-2018 (Amendment to IEEE Std 802.1Q™-2018 as amended by IEEE Std 802.1Qcp™-2018) IEEE Standard for Local and Metropolitan Area Networks-Bridges and Bridged Networks, Amendment 31:Stream Reservation Protocol (SRP)Enhancements and Performance Improvements, LAN/MAN Standards Committee of the IEEE Computer Society,Jun. 14, 2018, IEEE-SA Standards Board, total 208 pages.

IEEE Std 802.1Qcr™-2020 (Amendment to IEEE Std 802.1Q™-2018 as amended by IEEE Std 802.1Qcp™ -2018, IEEE Std 802.1Qcc™-2018, IEEE Std 802.1Qcy™-2019, and IEEE Std 802.1Qcx™-2020), IEEE Standard for Local and Metropolitan Area Networks-Bridges and Bridged Networks, Amendment 34: Asynchronous Traffic Shaping, LAN/MAN Standards Committee of the IEEE Computer Society,Sep. 24, 2020, IEEE-SA Standards Board, total 151 pages.

IEEE P802.1Qdd™/D0.5, Sep. 2021, IEEE P802.1Qdd/D0.5 Draft Standard for Local and metropolitan area networks-Bridges and Bridged Networks-Amendment: Resource Allocation Protocol, LAN/MAN Standards Committee of the IEEE Computer Society, Prepared by the Time-Sensitive Networking Task Group of IEEE 802.1, Sep. 2021, total 95 pages.

IEEE Std 802.1CS™-2020 IEEE Standard for Local and Metropolitan Area Networks-Link-local Registration Protocol LAN/MAN Standards Committee of the IEEE Computer Society,Dec. 3, 2020, IEEE-SA Standards Board, total 151 pages.

* cited by examiner

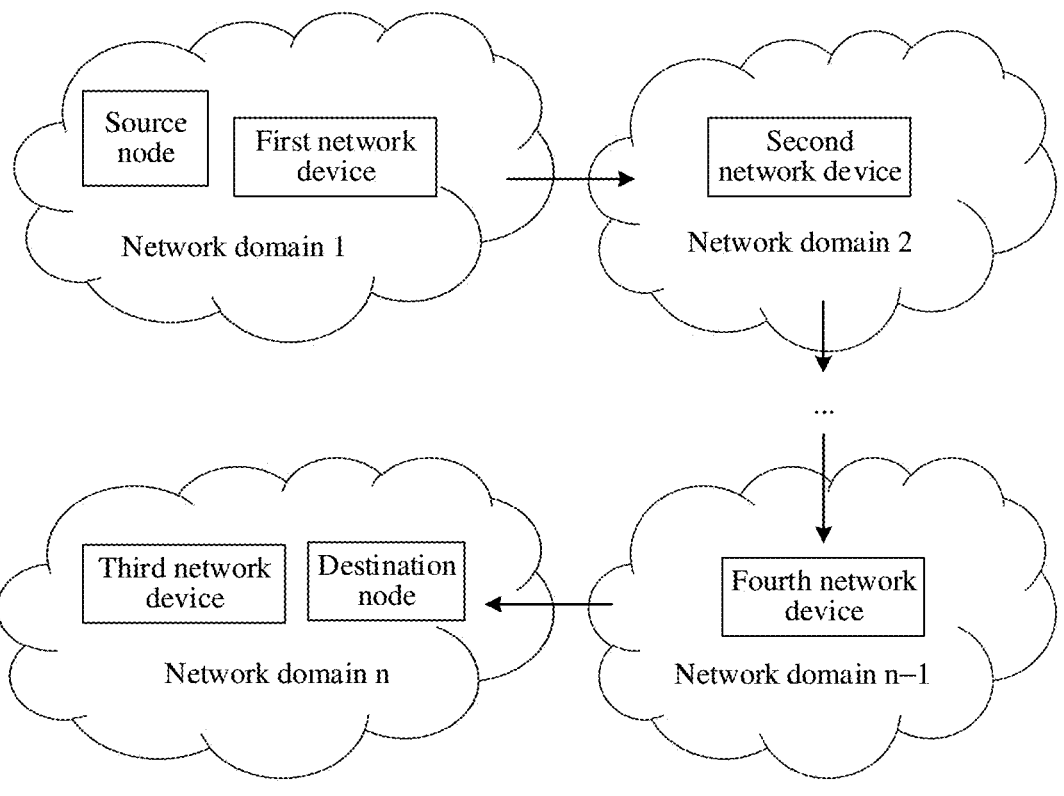

FIG. 2

```
First message
+-Traffic configuration information
+---Reserved state (ing/fail/success)
+---Traffic characteristic
+-----Source MAC/Destination MAC/vlan, IP header related information, traffic
identification information, and the like
+-----Interval+Maximum quantity of frames per period+Maximum frame length/
Average rate+Burst size+Maximum frame length
+-----Time characteristics (earliest and latest sending phases and jitters in a period)
+-----Target latency
+---First accumulated latency
+---Boundary information
+-----First device identifier (for example, MAC address)
+-----Boundary traffic characteristic
+-Local domain information
+---First domain ID list
```

FIG. 3

Message indicating that a reserved state is "fail"
+-Traffic configuration information
+----Reserved state (ing/fail/success)
+----Traffic basic information
+------Basic information (source MAC/destination MAC/vlan, IP header related information, traffic identification information, and the like)
+-Local domain information
+----Domain ID list Second message
+−Traffic configuration information
+−−−Reserved state (ing/fail/success)
+−−−Traffic basic information
+−−−−−Basic information (source MAC/destination MAC/vlan, IP header related information, traffic identification information, and the like)
+−Local domain information
+−−−Domain ID list

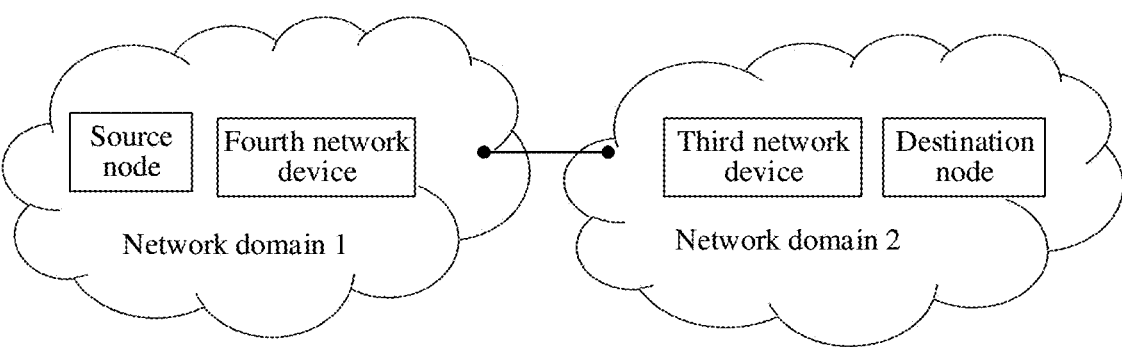

FIG. 10

```
Policy delivery message
+-Traffic configuration information
+----Traffic basic information
+------Basic information (source MAC/destination MAC/vlan, IP header related
information, traffic identification information, and the like)
+-Policy information
+----Fifth domain ID list
+----Target sub-latency
```

FIG. 11

```
Third probe packet
+-Traffic configuration information
+----Reserved state (ing/fail/success)
+----Traffic characteristic
+------Source MAC/Destination MAC/vlan, IP header related information, traffic
identification information, and the like
+------Interval+Maximum quantity of frames per period+Maximum frame length/
Average rate+Burst size+Maximum frame length
+------Time characteristics (earliest and latest sending phases and jitters in a period)
+------Target latency
+----Boundary information
+------Second device identifier (for example, MAC address)
+-Local domain information
+----First domain ID list
+----Domain type (QoS, Gate, or wireless)
```

FIG. 12

Policy delivery message
+--Traffic configuration information
+----Traffic characteristic
+------Source MAC/Destination MAC/vlan, IP header related information, traffic identification information, and the like
+------Interval+Maximum quantity of frames per period+Maximum frame length/Average rate+Burst size+Maximum frame length
+------Time characteristics (earliest and latest sending phases and jitters in a period)
+--Policy information
+----Fifth domain ID list
+----Target sub-latency

FIG. 13

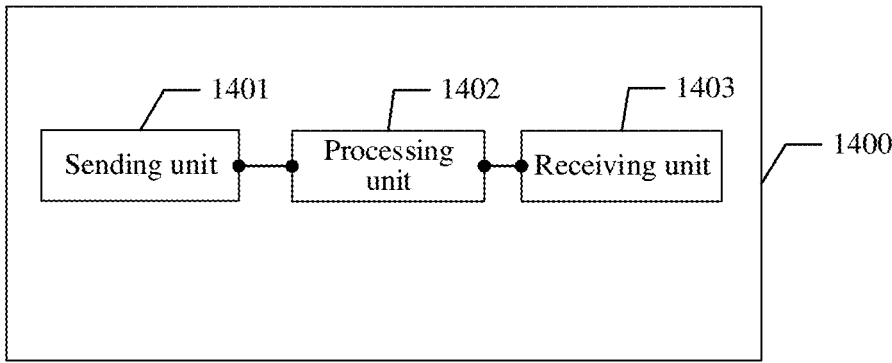

FIG. 14

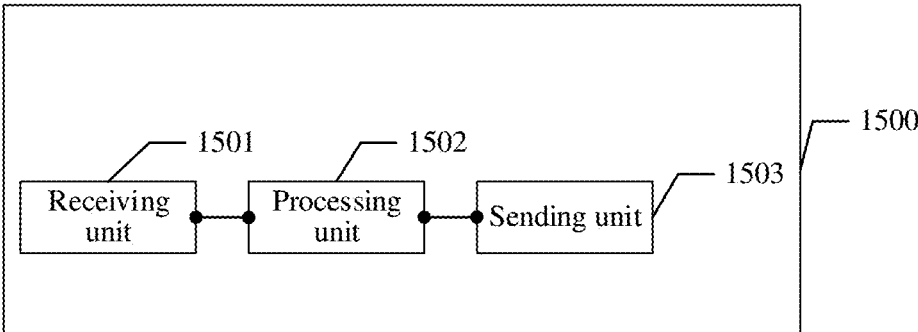

FIG. 15

NETWORK TRANSMISSION METHODS AND RELATED DEVICE THEREOF

CROSS-REFERENCE TO RELATED APPLICATIONS

This application is a continuation of International Application No. PCT/CN2023/082973, filed on Mar. 22, 2023, which claims priority to Chinese Patent Application No. 202210493373.1, filed on May 7, 2022. The disclosures of the aforementioned applications are hereby incorporated by reference in their entireties.

TECHNICAL FIELD

Embodiments of this application relate to the communication field, and in particular, to network transmission methods and a related device thereof.

BACKGROUND

Time-sensitive networking (TSN) mainly defines mechanisms for time-sensitive transmission over an Ethernet, and is derived from an Institute of Electrical and Electronics Engineers (IEEE) 802.1Qcc virtual local area network. Time-sensitive networking is especially concerned with a deterministic latency, a low latency, and high availability of transmission. In addition, application scenarios of the TSN are extensive. For example, in the industry, conventional TSN technologies are important enabling technologies in industrial automation, Industry 4.0, an industrial internet, smart manufacturing, and the like.

Currently, TSN configuration models are classified into a fully distributed model, a centralized network/distributed user model, and a fully centralized model. A centralized network configuration (CNC) controller is needed in each of the centralized network/distributed user model and the fully centralized model. The CNC controller thereof obtains user requirement information through a user network interface, and completes configuration for a TSN switch according to a network management protocol, so that service performance of traffic is ensured by using the TSN technologies.

A network is a multi-domain network, each network domain of the networks may use a different TSN scheduling solution, and each network domain is independently managed. Therefore, a corresponding TSN technology needs to be specially provided for traffic in each network domain. However, reserved resources cannot be configured in the TSN for inter-domain traffic. Consequently, service performance of the inter-domain traffic, for example, a bounded latency and reliability, cannot be ensured.

SUMMARY

This application provides network transmission methods and a related device thereof, and is applied to the internet industry. Based on a planned latency of TSN planning for inter-domain traffic in each network domain and a latency that is needed by inter-domain traffic transmission for a network, TSN configuration is implemented for the inter-domain traffic in each network domain, to ensure service performance of the inter-domain traffic.

According to a first aspect, a network transmission method is provided. The method includes:

A first network device determines a first planned latency based on a traffic characteristic of a data flow, where the first planned latency is a maximum latency for transmitting the data flow in a first network domain, and the first network domain is a network domain in TSN.

Then, the first network device updates a first accumulated latency based on the first planned latency, where the first accumulated latency is a maximum accumulated latency of the data flow from a source node to a destination node in the TSN, and the source node and the destination node belong to different network domains in the TSN.

Next, when the first accumulated latency is not greater than a target latency, the first network device sends a first message to a second network device, where the first message includes the first accumulated latency, the target latency is a needed latency of the data flow from the source node to the destination node in the TSN, the second network device belongs to a second network domain in the TSN, and the second network domain is a next network domain of the first network domain.

In this implementation of this application, when the first accumulated latency is not greater than the target latency, the first network device sends the first message to the second network device, to ensure that a reserved resource can be configured for the data flow in the second network domain based on the first message. In this way, reserved resources are configured for inter-domain traffic, to ensure quality of service of the inter-domain traffic.

In a possible implementation of the first aspect, before the first network device sends the first message to the second network device, the first network device may update the traffic characteristic of the data flow based on a domain type of the first network domain, where the first message further includes an updated traffic characteristic.

In this implementation of this application, the first network device updates the traffic characteristic of the data flow based on the domain type of the first network domain, and the first message includes the updated traffic characteristic. In this way, more accurate resource reservation can be performed on the inter-domain data flow in the second network domain based on the updated traffic characteristic, so that accuracy of the first accumulated latency is improved.

In a possible implementation of the first aspect, the first message further includes a first domain identifier (identity document, ID) list, the first domain ID list includes at least a first domain ID corresponding to the first network domain, and the first domain ID identifies the first network domain.

In this implementation of this application, the first message includes the first domain ID list. A domain controller in the second network domain can determine, based on the first domain ID list, a network domain through which the data flow passes, and obtain a new domain ID list, to record network domains through which the data flow passes. This is convenient to improve work efficiency.

In a possible implementation of the first aspect, before the first network device sends the first message to the second network device, the first network device sends a first probe packet to the second network device, where the first probe packet is used to determine a second domain ID list, the second domain ID list includes at least domain IDs corresponding to the first network domain and the second network domain, and the domain IDs identify the network domains in the TSN.

In this implementation of this application, the first network device sends the first probe packet to the second network device, to record the network domains through which traffic passes. This reflects diversity and selectivity of solutions and increases application scenarios.

In a possible implementation of the first aspect, the first network device receives a second message from a network domain to which the destination node belongs, where the second message indicates that a configuration state of a reserved resource for the data flow is "success"; and the first network device reserves the resource for the data flow based on the second message.

Alternatively, the first network device receives a message including that a configuration state of a reserved resource for the data flow is "fail", and then the first network device reserves no resource for the data flow based on this.

In this implementation of this application, the first network device receives the second message from the network domain to which the destination node belongs, where the second message indicates that the state of the reserved resource for the data flow is "success"; and then the first network device may reserve the resource for the data flow based on the second message. In this way, quality of service of the data flow can be ensured, and reliability of the solutions can be improved.

In a possible implementation of the first aspect, before the first network device determines the first planned latency based on the traffic characteristic of the data flow, the first network device receives a third message from a previous network domain of the first network domain, where the third message includes the traffic characteristic of the data flow (for example, the first network domain is an intermediate network domain that is in the TSN and that the data flow passes through); or the first network device determines the traffic characteristic of the data flow based on the data flow, where the first network device is the source node.

In this implementation of this application, when the first network device is in an intermediate network domain, the first network device may obtain the traffic characteristic of the data flow from the previous network domain of the first network domain; or when the first network device is the source node, the first network device may directly determine the traffic characteristic of the data flow based on the data flow. This increases the application scenarios of the solutions.

In a possible implementation of the first aspect, the first network device sends the target latency to the second network device. Specifically, the first message may include the target latency, or another message includes the target latency. This is not specifically limited herein.

In this implementation of this application, the first network device sends the target latency to the second network device, and the target latency may be included in the first message or another message. This further reflects the diversity and selectivity of the solutions.

In a possible implementation of the first aspect, the first domain ID list further includes a domain ID corresponding to a previous network domain of the first network domain. Specifically, when the first network domain is an intermediate network domain, the first domain ID list further includes the domain ID corresponding to the network domain through which the data flow passes and that is prior to the first network domain.

In this implementation of this application, the first domain ID list further includes the domain ID corresponding to the previous network domain of the first network domain. This clarifies network domains through which the data flow passes, and increases application scenarios of solutions.

In a possible implementation of the first aspect, the first message further includes a first device identifier, and the first device identifier is a device identifier of a boundary device that is in the first network domain and that is connected to the second network domain.

In this implementation of this application, the first message further includes the first device identifier, so that the domain controller in the second network domain determines a traffic transmission path based on the first device identifier. This increases the diversity and reliability of the solutions.

In a possible implementation of the first aspect, the first probe packet further includes the traffic characteristic of the data flow.

In this implementation of this application, the first probe packet further includes the traffic characteristic of the data flow. This reflects the selectivity of the solutions and increases the application scenarios of the solutions.

According to a second aspect, a network transmission method is provided. The method includes:

A third network device receives a fourth message sent by a fourth network device, where the fourth message includes a first accumulated latency and a traffic characteristic of a data flow, the first accumulated latency is a maximum accumulated latency of the data flow from a source node to a destination node in TSN, the source node and the destination node belong to different network domains in the TSN, the third network device and the destination node belong to a third network domain in the TSN, and the fourth network device belongs to a previous network domain of the third network domain.

Then, the third network device determines a third planned latency based on the traffic characteristic of the data flow, where the third planned latency is a maximum latency for transmitting the data flow in the third network domain.

In addition, the third network device updates the first accumulated latency based on the third planned latency.

Next, the third network device determines, based on the first accumulated latency and a target latency, whether a reserved resource for the data flow is successfully configured, where the target latency is a needed latency of the data flow from the source node to the destination node in the TSN.

In this implementation of this application, the third network device receives the fourth message, updates the first accumulated latency based on the first accumulated latency and the third planned latency, and determines, based on the updated first accumulated latency and the target latency, whether the reserved resource for the data flow is successfully configured. This ensures that reserved resources can be configured for the inter-domain data flow, and further determines whether the configuration is successful, thereby ensuring quality of service of inter-domain traffic.

In a possible implementation of the second aspect, when the first accumulated latency is not greater than the target latency, the third network device determines that the reserved resource for the data flow is successfully configured; or when the first accumulated latency is greater than the target latency, the third network device determines that the reserved resource for the data flow is unsuccessfully configured.

In this implementation of this application, when the first accumulated latency is not greater than the target latency, it is determined that the reserved resource for the data flow is successfully configured; or when the first accumulated latency is greater than the target latency, it is determined that the reserved resource for the data flow is unsuccessfully configured. This further clarifies implementations of solutions, and improves reliability of the solutions.

In a possible implementation of the second aspect, the traffic characteristic of the data flow is obtained by the fourth network device based on a domain type of the previous network domain (in this case, the fourth network device belongs to an intermediate network domain through which the data flow passes); or the traffic characteristic of the data flow is obtained by the fourth network device based on the data flow (in this case, the fourth network device is the source node, and the data flow is sent by the fourth network device).

In this implementation of this application, the following specific descriptions are provided: When the fourth network device belongs to an intermediate network domain, the traffic characteristic of the data flow is obtained by the fourth network device based on the domain type of the previous network domain; or when the fourth network device is the source node, the traffic characteristic of the data flow is obtained by the fourth network device based on the data flow. This reflects a plurality of application scenarios of the solutions.

In a possible implementation of the second aspect, the fourth message further includes a third domain ID list, the third domain ID list includes domain IDs corresponding to network domains through which the data flow passes, and the domain IDs identify the network domains in the TSN.

In this implementation of this application, the fourth message further includes the third domain ID list, and the third network device may determine a transmission path of the data flow based on the third network domain ID list. This is convenient to improve work efficiency of the third network device.

In a possible implementation of the second aspect, before the third network device receives the fourth message sent by the fourth network device, the third network device may receive a second probe packet sent by the fourth network device, where the second probe packet is used to determine a fourth domain ID list, the fourth domain ID list includes domain IDs corresponding to network domains ranging from a network domain to which the source node belongs to the network domain to which the destination node belongs, and the domain IDs identify the network domains in the TSN.

In this implementation of this application, the third network device may receive the second probe packet sent by the fourth network device, to determine the fourth domain ID list and obtain the transmission path of the data flow. This reflects diversity of the solutions.

In a possible implementation of the second aspect, when the first accumulated latency is not greater than the target latency, the third network device sends a second message, where the second message indicates that a configuration state of the reserved resource for the data flow is "success"; and then a controller in a network domain that receives the second message reserves a resource for the data flow.

Alternatively, when the first accumulated latency is greater than the target latency, the third network device sends a message indicating that a configuration state of the reserved resource for the data flow is "fail"; and then a controller in a network domain that receives the message reserves no resource for the data flow.

In this implementation of this application, when the first accumulated latency is not greater than the target latency, the third network device sends the second message; or when the first accumulated latency is greater than the target latency, the third network device sends the message indicating that the configuration state of the reserved resource for the data flow is "fail", so that the controller in the network domain that receives the corresponding message reserves the resource or reserves no resource for the data flow. In this way, reserved resources are further configured for the inter-domain data flow, and a corresponding operation is performed based on a configuration result. This further reflects the diversity and reliability of the solutions and increases application scenarios.

In a possible implementation of the second aspect, the third network device sends the second message to network devices in corresponding network domains (that is, the network device is a domain controller) based on the third domain ID list or the fourth domain ID list.

In this implementation of this application, the third network device sends the second message to the network devices in the corresponding network domains based on the third domain ID list or the fourth domain ID list. This ensures that controllers in network domains through which the data flow passes can all receive the second message, and reserve resources for the data flow, so that the reliability of the solutions is improved.

In a possible implementation of the second aspect, the fourth message further includes a second device identifier, and the second device identifier is a device identifier of a boundary device that is in the network domain to which the fourth network device belongs and that is connected to the third network domain.

In this implementation of this application, the fourth message includes the second device identifier, so that the third network device determines the traffic transmission path based on the second device identifier. This increases the diversity and reliability of the solutions.

According to a third aspect, a network transmission method is provided. The method includes:

A policy decision entity obtains a fifth domain ID list. The fifth domain ID list includes domain IDs corresponding to network domains ranging from a network domain to which a source node belongs to a network domain to which a destination node belongs, the source node and the destination node belong to different network domains in TSN, and the domain IDs identify the network domains.

Then, the policy decision entity determines, based on a policy and the fifth domain ID list, target sub-latencies corresponding to the network domains ranging from the network domain to which the source node belongs to the network domain to which the destination node belongs, and sends the corresponding target sub-latencies. Then, domain controllers in the network domains ranging from the network domain to which the source node belongs to the network domain to which the destination node belongs determine, based on the target sub-latencies and planned latencies corresponding to the network domains, whether reserved resources for a data flow are successfully configured. The policy is used to indicate to allocate target sub-latencies based on a target latency, the target latency is a needed latency of the data flow from the source node to the destination node in the TSN, and the planned latency is a maximum latency for transmitting the data flow in a network domain.

In this implementation of this application, the policy decision entity obtains the fifth domain ID list, obtains, based on the policy and the fifth domain ID list, the target sub-latencies corresponding to the network domains ranging from the network domain to which the source node belongs to the network domain to which the destination node belongs, and sends the corresponding target sub-latencies to the network domains. This ensures that the network devices in the network domains can determine, based on the target sub-latencies and the planned latencies, whether the reserved resources for the data flow are successfully configured. In this way, reserved resources are configured for inter-domain traffic, to ensure quality of service of the inter-domain traffic.

In a possible implementation of the third aspect, the fifth domain ID list is sent by a third network device, and the third network device and the destination node belong to a same network domain.

In this implementation of this application, the fifth domain ID list is sent by the third network device that belongs to the network domain to which the destination node belongs. This reflects reliability of solutions.

In a possible implementation of the third aspect, a sum of the target sub-latencies corresponding to the network domains included in the fifth domain ID list is less than or equal to the target latency.

In this implementation of this application, the sum of the target sub-latencies corresponding to the network domains included in the fifth domain ID list is less than or equal to the target latency. This reflects flexibility and selectivity of the solutions.

According to a fourth aspect, a network transmission method is provided. The method includes:

A third network device receives a third probe packet sent by a fourth network device. The third probe packet includes a sixth domain ID list, the sixth domain ID list includes domain IDs corresponding to network domains through which a data flow passes, the domain IDs identify the network domains in TSN, and a source node and a destination node of the data flow belong to different network domains in the TSN.

Then, the third network device determines a fifth domain ID list based on the sixth domain ID list, and sends the fifth domain ID list to a policy decision entity. The fifth domain ID list includes domain IDs corresponding to network domains ranging from a network domain to which the source node belongs to a network domain to which the destination node belongs.

The third network device receives a target sub-latency. The target sub-latency is obtained by the policy decision entity based on the fifth domain ID list and a policy, the policy is used to indicate to allocate target sub-latencies based on a target latency, and the target latency is a needed latency of the data flow from the source node to the destination node in the TSN.

The third network device obtains a corresponding planned latency based on a traffic characteristic of the data flow. The planned latency is a maximum latency for transmitting the data flow in a network domain.

After obtaining the corresponding target sub-latency and the corresponding planned latency, the third network device determines, based on the corresponding target sub-latency and the corresponding planned latency, whether a reserved resource for the data flow is successfully configured.

In this implementation of this application, the third network device determines, based on the corresponding planned latency and the corresponding target sub-latency, whether the reserved resource for the data flow is successfully configured. In this way, a domain controller in the network domain configures the reserved resource for inter-domain traffic, thereby ensuring quality of service of the inter-domain traffic.

In a possible implementation of the fourth aspect, the fifth domain ID list further includes domain types corresponding to the domain IDs.

In this implementation of this application, the fifth domain ID list further includes the domain types corresponding to the domain IDs, so that the policy decision entity obtains, based on the domain types, a target sub-latency corresponding to each network domain. This increases selectivity and diversity of solutions.

According to a fifth aspect, a network device is provided. The network device has a function of implementing the method in any one of the first aspect or the possible implementations of the first aspect. The function may be implemented by using hardware, or may be implemented by hardware executing corresponding software. The hardware or software includes one or more modules corresponding to the function.

In this implementation of this application, the network device according to the fifth aspect performs the method described in any one of the first aspect or the possible implementations of the first aspect of this application.

According to a sixth aspect, a network device is provided. The network device has a function of implementing the method in any one of the second aspect or the possible implementations of the second aspect. The function may be implemented by using hardware, or may be implemented by hardware executing corresponding software. The hardware or software includes one or more modules corresponding to the function.

In this implementation of this application, the network device according to the sixth aspect performs the method described in any one of the second aspect or the possible implementations of the second aspect of this application.

According to a seventh aspect, a network device is provided. The network device has a function of implementing the method in any one of the third aspect or the possible implementations of the third aspect. The function may be implemented by using hardware, or may be implemented by hardware executing corresponding software. The hardware or software includes one or more modules corresponding to the function.

In this implementation of this application, the network device according to the seventh aspect performs the method described in any one of the third aspect or the possible implementations of the third aspect of this application.

According to an eighth aspect, a network device is provided. The network device has a function of implementing the method in any one of the fourth aspect or the possible implementations of the fourth aspect. The function may be implemented by using hardware, or may be implemented by hardware executing corresponding software. The hardware or software includes one or more modules corresponding to the function.

In this implementation of this application, the network device according to the eighth aspect performs the method described in any one of the fourth aspect or the possible implementations of the fourth aspect of this application.

According to a ninth aspect, another communication apparatus is provided. The communication apparatus may include a processor, and the processor is coupled to a memory. The memory is configured to store instructions, and the processor is configured to execute the instructions in the memory, so that the communication apparatus performs the method described in any one of the first aspect or the possible implementations of the first aspect of this application.

According to a tenth aspect, another communication apparatus is provided. The communication apparatus includes a processor, configured to execute a computer program (or computer-executable instructions) stored in a memory. When the computer program (or the computer-executable instructions) is executed, the method in the first aspect and the possible implementations of the first aspect is performed.

In a possible implementation, the processor and the memory are integrated with each other.

In another possible implementation, the memory is located outside the communication apparatus.

The communication apparatus further includes a communication interface. The communication interface is used by the communication apparatus to communicate with another device, for example, send or receive data and/or signals. For example, the communication interface may be a transceiver, a circuit, a bus, a module, or a communication interface of another type.

According to an eleventh aspect, a computer-readable storage medium is provided, including computer-readable instructions. When the computer-readable instructions are run on a computer, the method described in any one of the first aspect or the possible implementations of the first aspect, any one of the second aspect or the possible implementations of the second aspect, any one of the third aspect or the possible implementations of the third aspect, or any one of the fourth aspect or the possible implementations of the fourth aspect of this application is performed.

According to a twelfth aspect, a computer program product is provided, including computer-readable instructions. When the computer-readable instructions are run on a computer, the method described in any one of the first aspect or the possible implementations of the first aspect, any one of the second aspect or the possible implementations of the second aspect, any one of the third aspect or the possible implementations of the third aspect, or any one of the fourth aspect or the possible implementations of the fourth aspect of this application is performed.

BRIEF DESCRIPTION OF THE DRAWINGS

FIG. 2 is a schematic diagram of an application scenario according to an embodiment of this application;

FIG. 3 is a schematic diagram of a first message according to an embodiment of this application;

FIG. 6 is a schematic diagram of a second message according to an embodiment of this application;

FIG. 7 is a schematic diagram in which a second network device belongs to a network domain to which a destination node belongs according to an embodiment of this application;

FIG. 10 is another schematic diagram of an application scenario according to an embodiment of this application;

FIG. 11 is a schematic diagram of a policy delivery message according to an embodiment of this application;

FIG. 12 is a schematic diagram of a third probe packet;

FIG. 13 is another schematic diagram of a policy delivery message according to an embodiment of this application;

FIG. 14 is a schematic diagram of a structure of a network device according to an embodiment of this application;

FIG. 15 is another schematic diagram of a structure of a network device according to an embodiment of this application.

DETAILED DESCRIPTION OF ILLUSTRATIVE EMBODIMENTS

Figure 1:
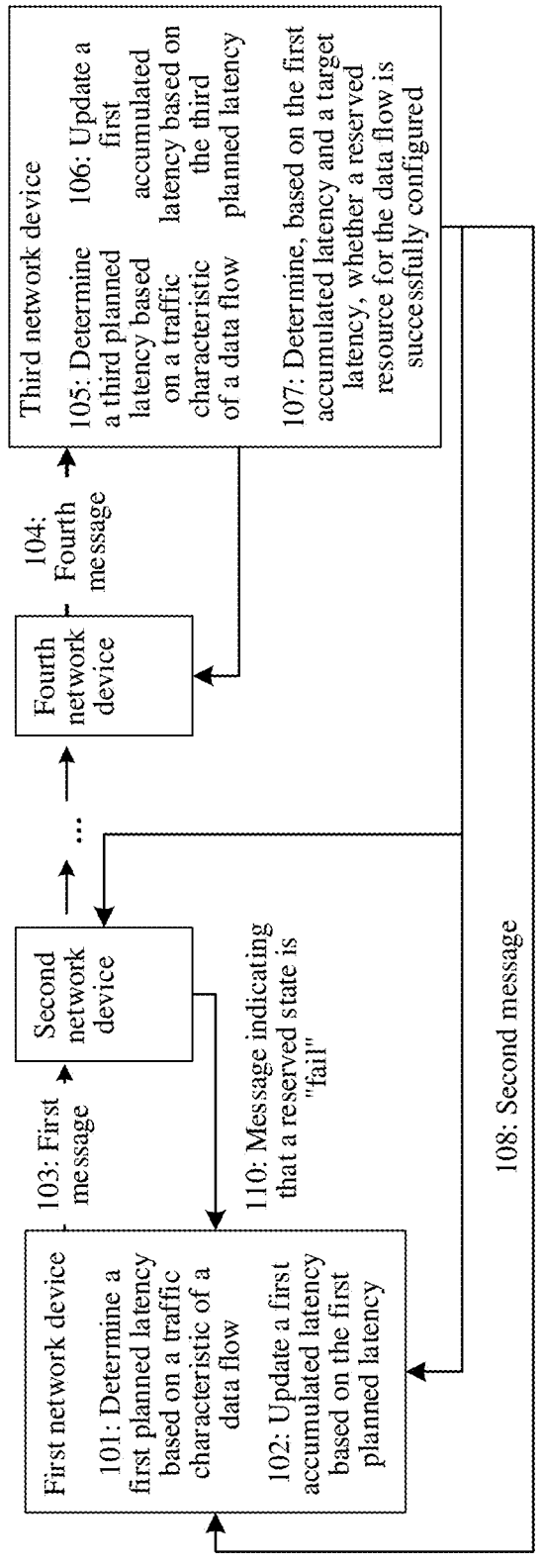
FIG. 1 is a schematic diagram of a network transmission method according to an embodiment of this application.

Embodiments of this application provide network transmission methods and a related device thereof, and are applied to the internet industry. This can ensure that TSN configuration is performed for inter-domain traffic, to ensure service performance of the inter-domain traffic.

In the specification, claims, and accompanying drawings of this application, terms such as "first" and "second" are intended to distinguish between similar objects but do not necessarily indicate a specific order or sequence. It should be understood that the terms used in such a way are interchangeable in proper circumstances, and this is merely a discrimination manner for describing objects having a same attribute in embodiments of this application. In addition, terms "include", "contain", and any other variants are intended to cover a non-exclusive inclusion, so that a process, method, system, product, or device that includes a series of units is not necessarily limited to those units, but may include other units not expressly listed or inherent to such a process, method, system, product, or device.

Before embodiments of this application are described, related content of TSN is first described briefly, to facilitate subsequent understanding of embodiments of this application.

The TSN is a set of standards researched by the time-sensitive networking task group of the IEEE 802.1 working group. This series of standards mainly defines mechanisms for time-sensitive transmission over an Ethernet, and is concerned with a deterministic latency, a low latency, and high availability of transmission. The TSN technical standards can be divided into four parts: a data plane, a control plane, time synchronization, and reliability. Several scheduling algorithms, frame preemption, and the like defined for the data plane are key technologies for implementing a deterministic latency characteristic in the TSN. For the control plane, related configuration for resource reservation is performed on a network device based on a requirement of a TSN service flow, to support work of the data plane in the TSN. Currently, common TSN configuration models are classified into a fully distributed model, a centralized network/distributed user model, and a fully centralized model.

In an industrial manufacturing scenario, a network is divided into a plurality of network domains, each network domain of the networks may use a different TSN solution, namely, a different TSN configuration model, and each network domain is independently managed. Therefore, for the TSN configuration models, a corresponding TSN technology needs to be specially provided for traffic in each network domain. However, traffic crosses the plurality of network domains, each network domain is independently managed, and TSN configuration cannot be performed for inter-domain traffic. Consequently, service performance of the inter-domain traffic, which is specifically, for example, a bounded latency and reliability, cannot be ensured for the networks.

To resolve the foregoing problem, embodiments of this application provide network transmission methods and a related device thereof, and are applied to the internet industry. A network transmission method includes: A first network device determines a first planned latency based on a traffic characteristic of a data flow, where the first planned latency is a maximum latency for transmitting the data flow in a first network domain, and the first network domain is a network domain in TSN. Then, the first network device updates a first accumulated latency based on the first planned latency, where the first accumulated latency is a maximum accumulated latency of the data flow from a source node to a destination node in the TSN, and the source node and the destination node belong to different network domains in the TSN. Next, when the first accumulated latency is not greater than a target latency, the first network device sends a first message to a second network device, where the first message includes the first accumulated latency, the target latency is a needed latency of the data flow from the source node to the destination node in the TSN, the second network device belongs to a second network domain in the TSN, and the second network domain is a next network domain of the first network domain. The first network domain may be a network domain to which the source node belongs, or an intermediate network domain through which the data flow passes. The second network domain may also be an intermediate network domain through which the data flow passes, or a network domain to which the destination node belongs. For inter-domain traffic, a domain controller in the network domain to which the source node belongs updates the accumulated latency, and sends an updated accumulated latency to the next network domain based on the first message. Then, a domain controller in the next network domain continues to update the first accumulated latency and other domain controllers successively perform update operations, until a domain controller in the network domain to which the destination node belongs obtains a finally updated first accumulated latency. Next, the domain controller of the destination node determines, based on information about the first accumulated latency and the target latency, whether a reserved resource for the data flow is successfully configured. Therefore, in this solution, based on the traffic characteristic of the data flow, the first accumulated latency, and the target latency, reserved resources for the inter-domain data flow can be configured in the network domains through which the inter-domain traffic passes, to ensure service performance of the inter-domain traffic.

Another network transmission method includes: A third network device receives a third probe packet sent by a fourth network device. The third probe packet includes a sixth domain ID list, the sixth domain ID list includes domain IDs corresponding to network domains through which a data flow passes, the domain IDs identify the network domains in TSN, and a source node and a destination node of the data flow belong to different network domains in the TSN. Then, the third network device determines a fifth domain ID list based on the sixth domain ID list, and sends the fifth domain ID list to a policy decision entity. The fifth domain ID list includes domain IDs corresponding to network domains ranging from a network domain to which the source node belongs to a network domain to which the destination node belongs. Next, the third network device receives a target sub-latency. The target sub-latency is obtained by the policy decision entity based on the fifth domain ID list and a policy, the policy is used to indicate to allocate target sub-latencies based on a target latency, and the target latency is a needed latency of the data flow from the source node to the destination node in the TSN. Subsequently, the third network device obtains a corresponding planned latency based on a traffic characteristic of the data flow. The planned latency is a maximum latency for transmitting the data flow in a network domain. In addition, after obtaining the corresponding target sub-latency and the corresponding planned latency, the third network device determines, based on the corresponding target sub-latency and the corresponding planned latency, whether a reserved resource for the data flow is successfully configured. The third network device can obtain, based on the third probe packet, the fifth domain ID list that includes the domain IDs corresponding to the network domains ranging from the network domain to which the source node belongs to the network domain to which the destination node belongs. The policy decision entity obtains, based on the fifth domain ID list and the policy, target sub-latencies corresponding to the network domains included in the fifth domain ID list, and sends the corresponding target sub-latencies to the network domains. Then, in the network domains, corresponding planned latencies are obtained based on the traffic characteristic of the data flow, and whether reserved resources for the data flow are successfully configured is determined based on the planned latencies and the target sub-latencies. In this way, whether the reserved resources for the data flow are successfully configured in the network domains can be monitored in real time, to ensure service performance of inter-domain traffic.

For better understanding of embodiments of this application, the following first details, with reference to the accompanying drawings, a network transmission method provided in embodiments of this application. A person of ordinary skill in the art can know that, as technologies develop and a new scenario emerges, technical solutions provided in embodiments of this application are also applicable to similar technical issues. For details, refer to FIG. 1 FIG. 1 is a schematic diagram of a network transmission method according to an embodiment of this application. The method specifically includes the following steps.

101: A first network device determines a first planned latency based on a traffic characteristic of a data flow.

The first network device determines the first planned latency based on the traffic characteristic of the data flow, where the first planned latency is a maximum latency for transmitting the data flow in a first network domain, and the first network domain is a network domain in TSN.

For example, for ease of understanding of this embodiment of this application, refer to an example in FIG. 2. FIG. 2 is a schematic diagram of an application scenario according to an embodiment of this application. A source node belongs to a network domain 1, and a destination node belongs to a network domain n (n is greater than 1). If the source node plans to send a data flow to the destination node, the data flow from the source node to the destination node crosses a plurality of network domains. Both the first network device and the source node belong to the first network domain, namely, the network domain 1 in FIG. 2, and the first network device is a domain controller in the first network domain (for example, the first network device is a CNC controller or a forwarding device having a CNC capability, and this is not specifically limited herein). In this case, the first network device obtains, from the source node, the traffic characteristic corresponding to the data flow, and then the first network device configures a reserved resource for the data flow based on the traffic characteristic of the data flow, to obtain the first planned latency.

For example, traffic characteristics of the data flow may include a source media access control address (MAC), a destination MAC address or a virtual local area network, internet protocol (IP) header related information, and data flow identification information of the data flow; further include a traffic interval, a maximum quantity of frames per cycle, an average rate, a burst size, a maximum frame length, and the like; and further include time characteristics of traffic, for example, earliest and latest sending phases and jitters in a cycle. The first network device determines, based on the traffic characteristic (for example, the destination MAC address) of the data flow, that a destination of the data flow is not in the first network domain, determines a transmission path of the data flow in the first network domain, and determines a reserved resource for the data flow based on an existing reserved resource on at least one transmission path. Alternatively, if there is no existing reserved resource, the first network device reconfigures a reserved resource for the data flow based on a determined transmission path, and determines the first planned latency based on the reserved resource and a latency requirement (an end-to-end target latency, for example, from a user).

For example, in the network domain to which the first network device belongs, the reserved resource for the data flow may be configured based on a TSN configuration model, for example, a fully distributed model, a centralized network/distributed user model, or a fully centralized model, or based on another TSN configuration model that can achieve a same objective, and the first planned latency is obtained. It can be understood that in an actual case, the TSN configuration model may be determined based on a specific situation. This is not specifically limited herein.

In a possible implementation, before the first network device determines the first planned latency based on the traffic characteristic of the data flow, the first network device receives a third message from a previous network domain of the first network domain, where the third message includes the traffic characteristic of the data flow. For example, the first network domain is an intermediate network domain that is in the TSN and that the data flow passes through. Therefore, the first network device receives the third message from the previous network domain of the first network domain. In addition, it can be understood that the source node may be outside the TSN. In this case, the first network device receives the traffic characteristic of the data flow sent by a boundary device from which the data flow enters the first network domain; or when the first network device is a boundary device from which the data flow enters the first network domain, the first network device obtains the traffic characteristic of the data flow sent by the source node. Alternatively, the first network device determines the traffic characteristic of the data flow based on the data flow, where the first network device is the source node.

It can be understood that in an actual case, a specific manner in which the first network device obtains the traffic characteristic of the data flow is determined based on an actual requirement. This is not specifically limited herein.

102: The first network device updates a first accumulated latency based on the first planned latency.

The first network device updates the first accumulated latency based on the first planned latency, where the first accumulated latency is a maximum accumulated latency of the data flow from the source node to the destination node in the TSN, and the source node and the destination node belong to different network domains in the TSN.

For example, as shown in FIG. 2, the source node and the destination node belong to different network domains in the TSN, and the first accumulated latency is a maximum accumulated latency of the data flow from the source node to the destination node in the TSN, that is, an accumulated planned latency corresponding to network domains ranging from the network domain to which the source node belongs to the network domain to which the destination node belongs. Both the first network device and the source node belong to the network domain 1. Therefore, after obtaining the first planned latency, the first network device determines the first planned latency as the first accumulated latency. In a possible implementation, the first network domain is an intermediate network domain. In this case, the first network device adds the first planned latency to a received first accumulated latency in the previous network domain to obtain an updated first accumulated latency.

103: The first network device sends a first message to a second network device.

When the first accumulated latency is not greater than a target latency, the first network device sends the first message to the second network device, where the first message includes the first accumulated latency, the target latency is a needed latency of the data flow from the source node to the destination node in the TSN, the second network device belongs to a second network domain in the TSN, and the second network domain is a next network domain of the first network domain.

Specifically, when the first accumulated latency is not greater than the target latency, it indicates that the first network device successfully configures the reserved resource for the data flow. Optionally, the first message may include a reserved state, and the reserved state identifies a current configuration state of the resource for the data flow. For example, for details, refer to FIG. 3. FIG. 3 is a schematic diagram of a first message according to an embodiment of this application. For the reserved state, "ing" indicates a persistent state, "success" indicates a successful state, or "fail" indicates a failed state, where "ing" indicates that the reserved resource continues to be configured for the data flow, "fail" indicates that the reserved resource for the data flow is unsuccessfully configured, and "success" indicates that the reserved resource for the data flow from the source node to the destination node is successfully configured. It can be understood that FIG. 3 is merely used as an example, and in an actual case, another form may be used to identify the configuration state of the reserved resource for the data flow. This is not specifically limited herein.

In the example shown in FIG. 3, the second network device belongs to the second network domain, namely, a network domain 2. The first network device sends the first message to the second network device, and the reserved state in the first message is "ing". If the second network device is a domain controller in the second network domain, the second network device may configure a reserved resource for the data flow based on the traffic characteristic of the data flow, to obtain a corresponding second planned latency. The second network device may update the first accumulated latency based on a sum of the first accumulated latency included in the first message and the second planned latency that is obtained by the second network device. Alternatively, if the second network device is a forwarding device in the second network domain, the second network device sends the first message to a domain controller in the second network domain, so that the domain controller in the second network domain obtains a second planned latency and updates the first accumulated latency.

In a possible implementation, the first message further includes the traffic characteristic of the data flow, or the first network device sends the traffic characteristic of the data flow to the second network device based on another message. Optionally, before step 103, the first network device may update the traffic characteristic of the data flow based on a domain type of the first network domain, where the first message further includes an updated traffic characteristic; and then the domain controller in the second network domain obtains the second planned latency based on the updated traffic characteristic.

An example in which the second network device is the domain controller in the second network domain is used for description. When configuring the reserved resource for the data flow based on the traffic characteristic, the second network device may update the traffic characteristic of the data flow based on the domain type of the first network domain. Optionally, for example, updating the traffic characteristic of the data flow based on the domain type of the first network domain specifically includes the following content: When the domain type of the network domain to which the first network device belongs is quality of service (QoS), the traffic characteristic includes at least a modified traffic characteristic derived through network calculation, an asynchronous traffic shaping (ATS) status (for example, committed information rate (cir) or a committed burst size (cbs)) when the data flow leaves the last boundary device in the network domain 1, or a credit-based shaping (CBS) status of traffic (for example, actual bandwidth idleSlope). When the domain type of the network domain to which the first network device belongs is a gating control type (for example, "Gate" is used to represent the gating control type), the updated traffic characteristic includes at least a gating control status of traffic, for example, a minimum gate open interval, gate open duration, and phase information in a cycle. When the domain type of the network domain to which the first network device belongs is a wireless type (for example, "wireless" is used to represent the wireless type), the traffic characteristic includes at least a maximum value of an air interface channel capacity.

In this implementation of this application, the domain controller in the second network domain configures the reserved resource for the data flow based on the updated traffic characteristic that is of the data flow and that is obtained based on the domain type of the first network domain, so that the second planned latency can be accurately obtained. This improves configuration accuracy.

In a possible implementation, the first message further includes a first domain ID list, the first domain ID list includes at least a first domain ID corresponding to the first network domain, and the first domain ID identifies the first network domain. Alternatively, before the first network device sends the first message to the second network device, that is, before step 103 is performed, the first network device sends a first probe packet to the second network device, where the first probe packet is used to determine a second domain ID list, the second domain ID list includes at least domain IDs corresponding to the first network domain and the second network domain, and the domain IDs identify the network domains in the TSN. It can be understood that the domain ID may be digits, letters, characters, or a combination of a digit, a letter, a character, or the like. This is not specifically limited herein. The following separately provides descriptions.

Manner 1: The first message further includes the first domain ID list.

The first message further includes the first domain ID list, and the first domain ID list includes at least the first domain ID corresponding to the first network domain. After the second network device receives the first message, the domain controller in the second network domain can determine, based on the first domain ID list, a network domain through which the data flow passes, and add, to the first domain ID list, the domain ID corresponding to the network domain to which the second network device belongs, to obtain a new domain ID list.

In this implementation of this application, the first message includes the first domain ID list. The second network device can directly determine, based on the first domain ID list, the network domain through which the data flow passes, and obtain the new domain ID list, to record network domains through which the data flow passes. This is convenient for the domain controller in the second network domain to improve work efficiency.

In a possible implementation, the first domain ID list further includes a domain ID corresponding to a previous network domain of the first network domain. Specifically, when the first network domain is an intermediate network domain, the first domain ID list further includes the domain ID corresponding to the network domain through which the data flow passes and that is prior to the first network domain. In this implementation of this application, network domains through which the data flow passes when the first network domain is an intermediate network domain is clarified. This increases application scenarios of the solutions.

Manner 2: Before step 103, the first network device sends the first probe packet to the second network device.

Before the first network device sends the first message to the second network device, the first network device sends the first probe packet to the second network device, to determine the second domain ID list. The second domain ID list includes at least the domain IDs corresponding to the first network domain and the second network domain. The domain controller in the second network domain determines, based on the first probe packet, the domain IDs corresponding to the network domains through which the data flow passes, and records the domain IDs in the second domain ID list, to record the network domains through which the data flow passes.

In this implementation of this application, the first network device sends the first probe packet to the second network device, to record the network domains through which the data flow passes. This reflects diversity and selectivity of the solutions and increases application scenarios.

In a possible implementation, the first network device sends the target latency to the second network device. Specifically, the first message may include the target latency, or another message includes the target latency. This is not specifically limited herein. It can be understood that the target latency may be alternatively provided on a domain controller in a network domain through which the data flow passes (for example, preset on the domain controller), and is determined based on an actual requirement in an actual case. This is not specifically limited herein.

In this implementation of this application, the first network device sends the target latency to the second network device, and the target latency may be included in the first message or another message. This further reflects the diversity and selectivity of the solutions.

In a possible implementation, the first message further includes a first device identifier, and the first device identifier is a device identifier of a boundary device that is in the first network domain and that is connected to the second network domain. For example, as shown in FIG. 2, the first network device obtains, based on a path solution, for example, a rapid spanning tree protocol (RSTP) or a shortest path bridging (SPB), a boundary device in the network domain 1 from which the data flow leaves and reaches the network domain 2, and sends a device identifier (for example, a MAC address; it can be understood that the device identifier may be alternatively another identifier, which is not specifically limited herein) of the boundary device to the second network device by using the first message.

In this implementation of this application, the first message includes the first device identifier, so that the domain controller in the second network domain determines a transmission path of the data flow based on the first device identifier. This increases the diversity and reliability of the solutions.

In a possible implementation, the first probe packet further includes the traffic characteristic of the data flow. The domain controller in the second network domain may configure the reserved resource for the data flow based on the traffic characteristic before the first message is obtained, to obtain the second planned latency. This improves work efficiency. In this implementation of this application, work efficiency is improved, the selectivity of the solutions is reflected, and the application scenarios of the solutions are increased.

In this implementation of this application, when the first accumulated latency is not greater than the target latency, the first message is sent to the second network device. This ensures that the domain controller in the second network domain can configure the reserved resource for the data flow, and ensures that reserved resources can be configured for inter-domain traffic, thereby ensuring service performance of the inter-domain traffic.

Optionally, when the first accumulated latency is greater than the target latency, step 110 is performed. Herein, an example in which the second network device is the domain controller in the second network domain is used for description.

110: The second network device sends, to the first network device, a message including that the reserved state for the data flow is "fail".

Figures 4, 5:
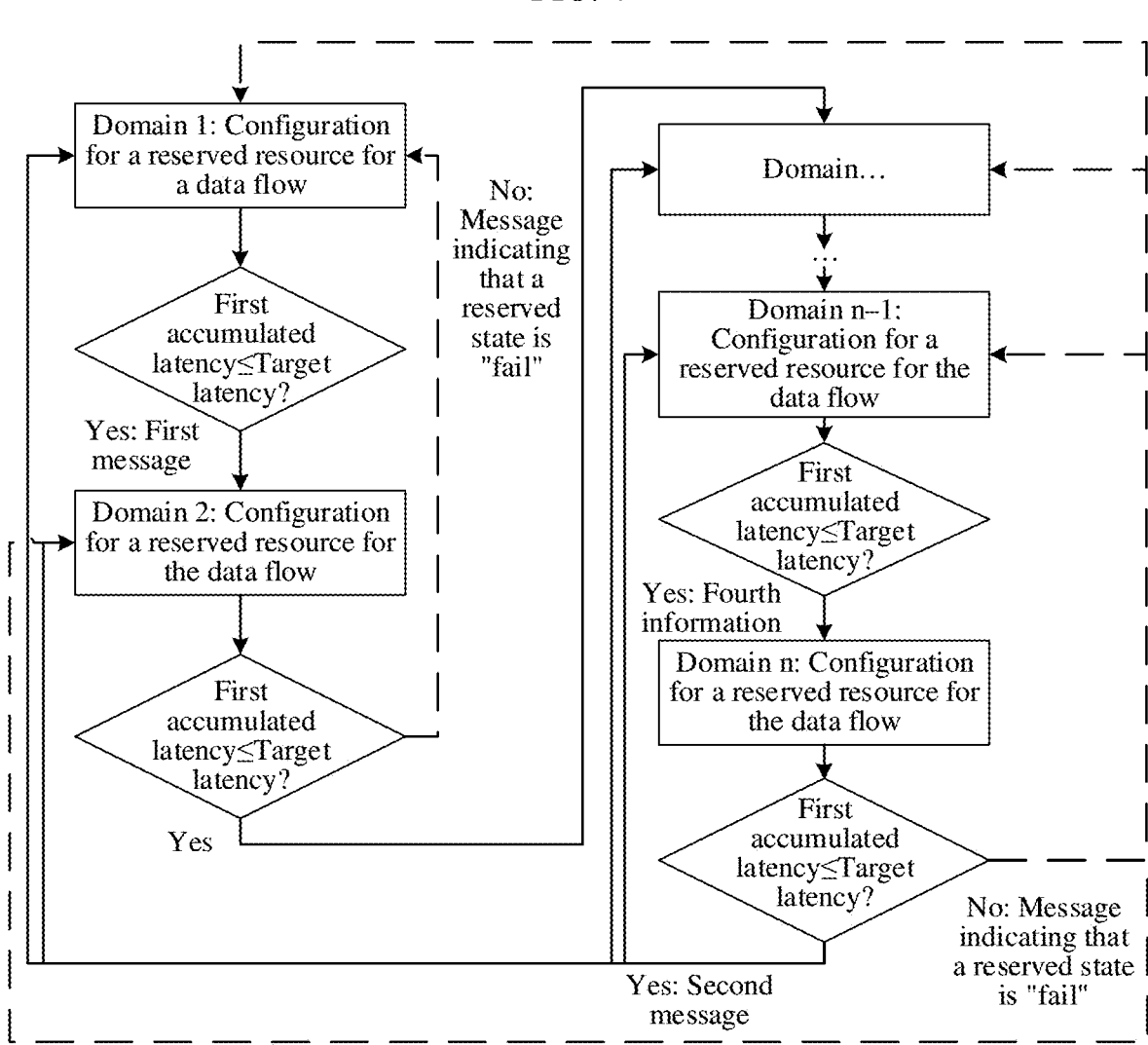
FIG. 4 is a schematic diagram of a first message according to an embodiment of this application.
FIG. 5 is a flowchart of sequential configuration for an inter-domain data flow according to an embodiment of this application.

When the first accumulated latency is greater than the target latency, the first network device receives the message that is sent by the second network device (that is, the domain controller in the second network domain) and that includes that the configuration state of the reserved resource for the data flow is "fail", and then the first network device reserves no resource for the data flow based on this. Optionally, the message may include the reserved state. For details, refer to FIG. 4. FIG. 4 is a message including that a reserved state is "fail" according to an embodiment of this application. The reserved state in the message is "fail", and identifies that the configuration state of the reserved resource for the data flow is "fail". For specific descriptions, refer to the reserved state included in the first message. Details are not described herein again.

In this implementation of this application, when the first accumulated latency is greater than the target latency, the first network device reserves no resource for the data flow. This increases the application scenarios of the solutions, and reduces a waste of network resources.

In addition, in the example in FIG. 2, the data flow needs to pass through n network domains from the source node to the destination node. When a first accumulated latency corresponding to any network domain after the first network domain is greater than the target latency, a domain controller in the network domain may send, to the first network device and a domain controller in a network domain prior to the any network domain, the message including that the configuration state of the reserved resource for the data flow is "fail".

Then, the domain controllers receiving the message reserve no resource for the data flow.

Moreover, the example in FIG. 2 is still used for description. Optionally, when the first accumulated latency is not greater than the target latency, the domain controller in the second network domain sends, to a network device in a next network domain, a message that carries at least the first accumulated latency and the traffic characteristic of the data flow. For a specific example herein, refer to FIG. 5. FIG. 5 is a flowchart of sequential configuration for an inter-domain data flow according to an embodiment of this application. A domain 1 to a domain n are respectively corresponding to the network domain 1 to the network domain n in FIG. 2. The source node is in the network domain 1, namely, the domain 1, and the destination node is in the network domain n, namely, the domain n. When the first accumulated latency is not greater than the target latency, the domain controller in the second network domain, namely, the domain 2, sends, to a network device in a next network domain, a message that carries at least the first accumulated latency and the traffic characteristic of the data flow. Content included in the message is similar to the content included in the first message. Details are not described herein again.

When the data flow needs to pass through n network domains from the source node to the destination node, as shown in FIG. 5, a process in which the domain controllers in the domain 2 to the domain n−1 update the first accumulated latency is similar to the process in which the first network device and the domain controller in the second network domain, namely, the domain 2, update the first accumulated latency. Details are not described herein again. When a first accumulated latency corresponding to the domain n−1 is not greater than the target latency, a fourth network device in FIG. 2 (in this case, the fourth network device is a domain controller in the domain n−1) sends a fourth message to a third network device (that is, a domain controller in a third network domain, namely, the domain n), that is, step 104 is performed. Then, subsequent step 105 to step 107 are performed.

104: The third network device receives the fourth message sent by the fourth network device.

The third network device receives the fourth message sent by the fourth network device, where the fourth message includes a first accumulated latency and a traffic characteristic of a data flow, the first accumulated latency is a maximum accumulated latency of the data flow from a source node to a destination node in TSN, the source node and the destination node belong to different network domains in the TSN, the third network device and the destination node belong to a third network domain in the TSN, and the fourth network device belongs to a previous network domain of the third network domain.

In a possible implementation, the traffic characteristic of the data flow is obtained by the fourth network device based on a domain type of the previous network domain (in this case, the fourth network device belongs to an intermediate network domain through which the data flow passes); or the traffic characteristic of the data flow is obtained by the fourth network device based on the data flow (in this case, the fourth network device is the source node, and the data flow is sent by the fourth network device).

In this implementation of this application, a plurality of application scenarios of the solutions are reflected.

In a possible implementation, the fourth message further includes a third domain ID list, the third domain ID list includes domain IDs corresponding to network domains through which the data flow passes, and the domain IDs identify the network domains in the TSN.

In this implementation of this application, the fourth message further includes the third domain ID list, and the third network device may determine a transmission path of the data flow based on the third network domain ID list. This is convenient to improve work efficiency of the third network device.

In a possible implementation, the fourth message further includes a second device identifier, and the second device identifier is a device identifier of a boundary device that is in the network domain to which the fourth network device belongs and that is connected to the third network domain. Specific content is similar to that of the first device identifier further included in the first message in step 103. Details are not described herein again.

In this implementation of this application, the fourth message includes the second device identifier, so that the third network device determines the traffic transmission path based on the second device identifier. This increases diversity and reliability of the solutions.

Step 104 is specifically similar to step 103. Details are not described herein again.

In a possible implementation, before step 104, the third network device may receive a second probe packet sent by the fourth network device, where the second probe packet is used to determine a fourth domain ID list, the fourth domain ID list includes domain IDs corresponding to network domains ranging from a network domain to which the source node belongs to the network domain to which the destination node belongs, and the domain IDs identify the network domains in the TSN.

In this implementation of this application, the fourth domain ID list is obtained by using the second probe packet, to record the network domains through which the data flow passes. This reflects the diversity and selectivity of the solutions and increases application scenarios.

105: The third network device determines a third planned latency based on the traffic characteristic of the data flow.

The third network device determines the third planned latency based on the traffic characteristic of the data flow, where the third planned latency is a maximum latency for transmitting the data flow in the third network domain. Specific content is similar to that in step 101. Details are not described herein again.

106: The third network device updates the first accumulated latency based on the third planned latency.

The third network device updates the first accumulated latency based on the third planned latency, that is, the third network device updates the first accumulated latency to a sum of the first accumulated latency in the fourth message and the third planned latency.

A specific process is similar to the process in which the domain controller in the second network domain updates the first accumulated latency. Details are not described herein again.

107: The third network device determines, based on the first accumulated latency and a target latency, whether a reserved resource for the data flow is successfully configured.

The third network device determines, based on the first accumulated latency and the target latency, whether the reserved resource for the data flow is successfully configured.

In a possible implementation, when the first accumulated latency is not greater than the target latency, the third network device determines that the reserved resource for the data flow is successfully configured; or when the first accumulated latency is greater than the target latency, the third network device determines that the reserved resource for the data flow is unsuccessfully configured. In this implementation of this application, implementations of the solutions are further clarified, and the reliability of the solutions is improved.

When the first accumulated latency is not greater than the target latency, the third network device sends a second message. Details are described in the following step 108.

108: The third network device sends the second message.

Figures 6, 7:
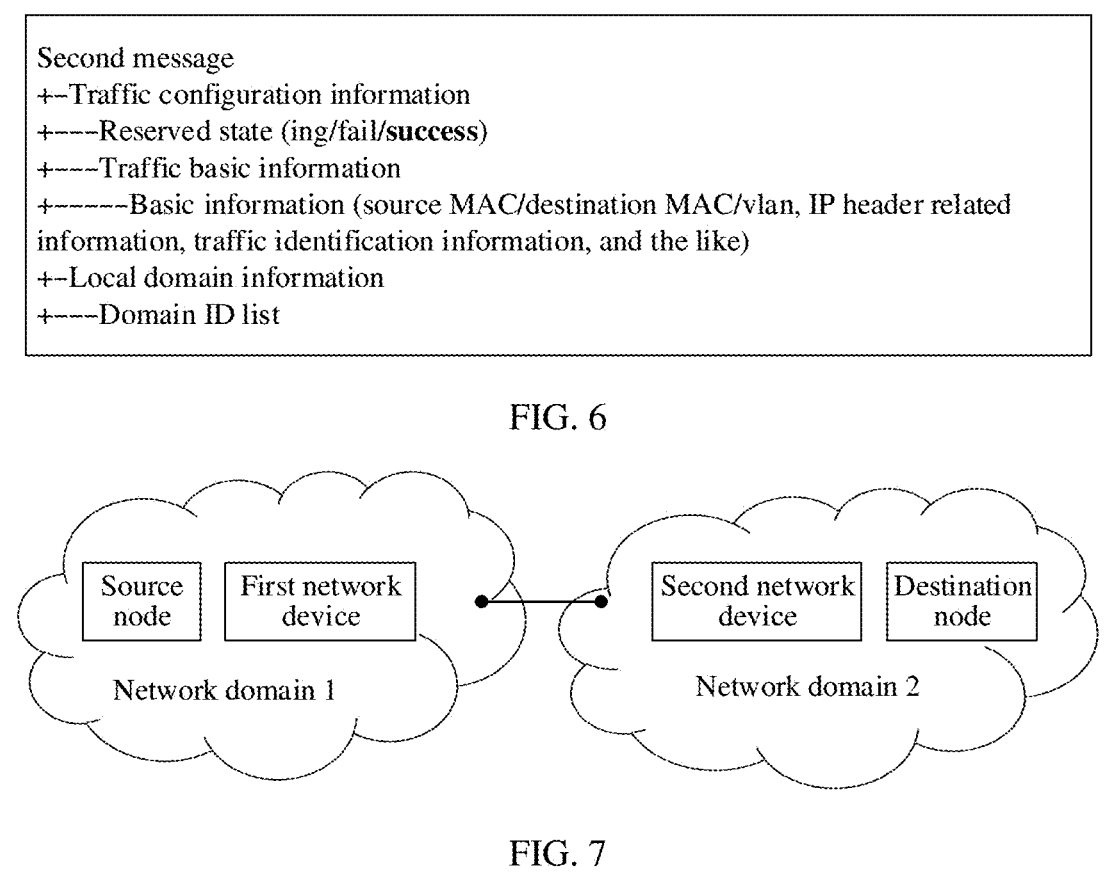

Specifically, when the first accumulated latency is not greater than the target latency, the third network device sends the second message, where the second message indicates that a configuration state of the reserved resource for the data flow is "success"; and then a controller in a network domain that receives the second message reserves a resource for the data flow. For example, as shown in FIG. 5, when the first accumulated latency is not greater than the target latency, the third network device sends, based on the third domain ID list or the fourth domain ID list, the second message to domain controllers, that is, network devices in corresponding network domains, namely, the domain 1 to the domain n–1. To be specific, the first network device receives the second message from the network domain to which the destination node belongs, where the second message indicates that the status of the reserved resource for the data flow is "success"; and then the first network device may reserve the resource for the data flow based on the second message. Optionally, a reserved state included in the second message is "success". For details, refer to FIG. 6. FIG. 6 is a schematic diagram of a second message according to an embodiment of this application.

Alternatively, when the first accumulated latency is greater than the target latency, the third network device performs step 109. Details are described in the following step 109.

109: The third network device sends a message including that a reserved state is "fail".

Specifically, when the first accumulated latency is greater than the target latency, the third network device sends a message indicating that a configuration state of the reserved resource for the data flow is "fail", and then a controller in a network domain that receives the message reserves no resource for the data flow. To be specific, the first network device receives the message including that the configuration state of the reserved resource for the data flow is "fail", and then the first network device reserves no resource for the data flow. For example, as shown in FIG. 5, when the first accumulated latency is greater than the target latency, the third network device separately sends, based on the third domain ID list or the fourth domain ID list, the message indicating that the reserved state is "fail" to domain controllers, that is, network devices in corresponding network domains, namely, the domain 1 to the domain n–1. Optionally, the reserved state included in the message indicating that the reserved state is "fail" is "fail".

In this implementation of this application, the third network device separately sends, based on the third domain ID list or the fourth domain ID list, the second message to the network devices in other network domains, namely, the domain controllers, to notify the other network domains that the reserved resource for the data flow is successfully configured currently. This further reflects the diversity and reliability of the solutions.

It can be understood that FIG. 1, FIG. 2, and FIG. 5 are merely used as examples to understand embodiments of this application, and do not constitute any substantial limitation on embodiments of this application. In an actual case, the network domain to which the source node belongs is adjacent to the network domain to which the destination node belongs, or the two network domains are separated from each other by n network domains. This is not specifically limited herein.

For an example in which the network domain to which the source node belongs is adjacent to the network domain to which the destination node belongs, refer to FIG. 7. FIG. 7 is a schematic diagram in which a second network device belongs to a network domain to which a destination node belongs according to an embodiment of this application. In this case, both the source node and the first network device belong to the network domain 1, and both the destination node and the second network device belong to the network domain 2. After step 101 to step 103, step 108 is performed when the first accumulated latency corresponding to the second network domain is not greater than the target latency. The following provides descriptions by using an example in which the second network device is the domain controller in the second network domain.

108: The second network device sends the second message to the first network device.

When the second network device is the domain controller in the network domain to which the destination node belongs, if the first accumulated latency obtained through updating by the second network device is not greater than the target latency, the first network device receives the second message sent by the second network device. In this implementation of this application, the application scenarios are increased, and selectivity and wide applicability of the solutions are reflected.

In this implementation of this application, the first network device obtains the first planned latency, updates the first accumulated latency, and when the first accumulated latency is not greater than the target latency, sends the first message to the second network device. Then, the domain controller in the next network domain continues to update the first accumulated latency based on the first message and other domain controllers perform update operations, until a domain controller in the network domain to which the destination node belongs updates the first accumulated latency. Next, the domain controller of the destination node determines, based on the finally obtained first accumulated latency and the target latency, whether the reserved resource for the data flow is successfully configured. The source node and the destination node of the data flow belong to different network domains in the TSN. This ensures that in the network domains through which the inter-domain traffic passes, corresponding planned latencies can be obtained based on the traffic characteristic of the data flow, and the first accumulated latency is updated, because whether reserved resource for the data flow is successfully configured can be determined based on the maximum accumulated latency of the data flow from the source node to the destination node in the TSN and the needed latency of the data flow from the source node to the destination node in the TSN. In this way, through the TSN, the reserved resources for the data flow are configured for the inter-domain traffic, to ensure service performance of the inter-domain traffic.

Figure 8:
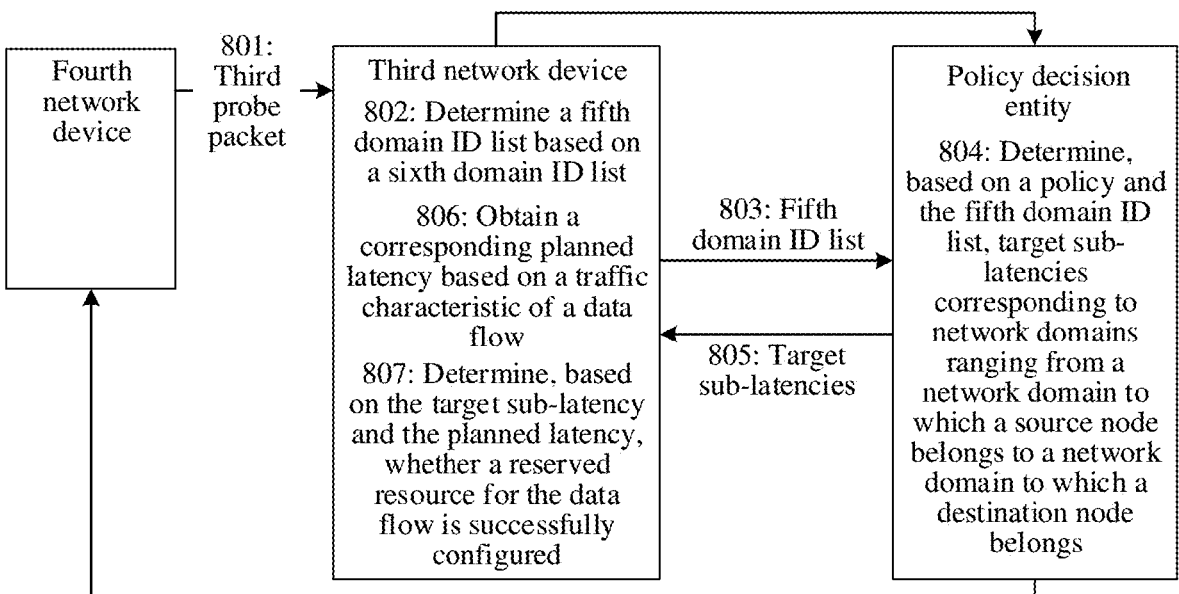
FIG. 8 is a schematic diagram of another network transmission method according to an embodiment of this application.

With reference to the accompanying drawings, the following details another network transmission method provided in embodiments of this application. A person of ordinary skill in the art can know that, as technologies develop and a new scenario emerges, technical solutions provided in embodiments of this application are also applicable to similar technical issues. For details, refer to FIG. 8. FIG. 8 is a schematic diagram of another network transmission method according to an embodiment of this application. The method specifically includes the following steps.

801: A third network device receives a third probe packet sent by a fourth network device.

The third network device receives the third probe packet sent by the fourth network device. The third probe packet includes a sixth domain ID list, the sixth domain ID list includes domain IDs corresponding to network domains through which a data flow passes, the domain IDs identify the network domains in TSN, and a source node and a destination node of the data flow belong to different network domains in the TSN.

Figure 9:
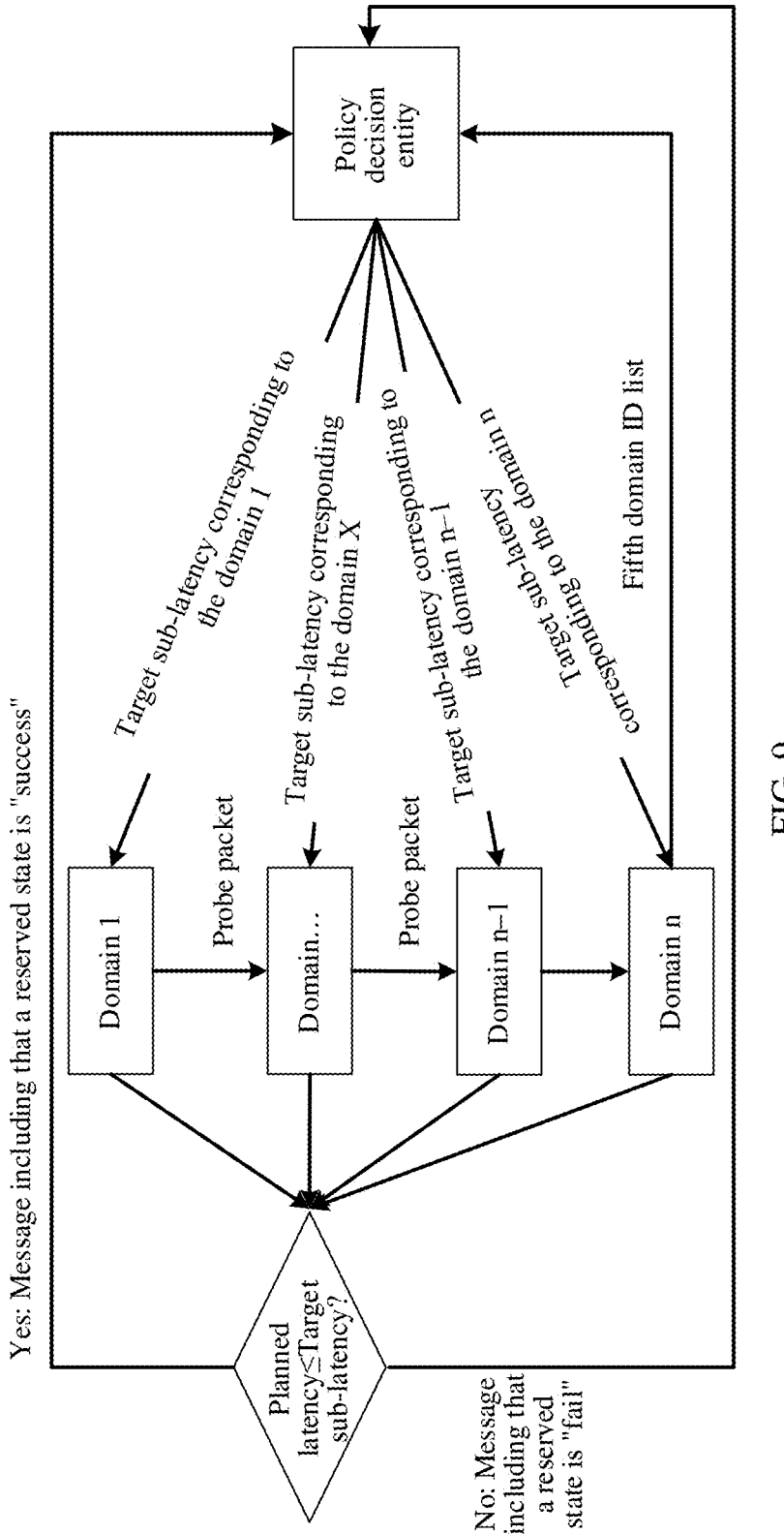
FIG. 9 is a flowchart of TSN planning performed for an inter-domain data flow based on a policy according to an embodiment of this application.

For example, refer to the application scenario in FIG. 2. The source node belongs to the network domain 1, and the destination node belongs to the network domain n (n>1). In this case, the data flow needs to cross n network domains, and both the third network device and the destination node belong to the network domain n. The first network device that belongs to the network domain 1 sends a probe packet to the second network device, where the probe packet is used to determine domain IDs of network domains to which the data flow passes. For a specific example, refer to FIG. 9. FIG. 9 is a flowchart of TSN planning performed for an inter-domain data flow based on a policy according to an embodiment of this application. A domain 1 to a domain n are respectively corresponding to the network domain 1 to the network domain n in FIG. 2. A probe packet is sent from the domain 1 to the domain 2 until the probe packet reaches the domain n−1, namely, the fourth network device. The fourth network device obtains a sixth domain ID list. The sixth domain ID list includes domain IDs corresponding to the network domain 1 to the network domain n−1. It can be understood that the domain ID may be digits, letters, characters, or a combination of a digit, a letter, a character, or the like. This is not specifically limited herein. In addition, a domain controller in the domain n−1, namely, the fourth network device, sends a third probe packet to a domain controller in the domain n, namely, the third network device, where the third probe packet includes the sixth domain ID list.

Moreover, optionally, refer to FIG. 10. FIG. 10 is another schematic diagram of an application scenario according to an embodiment of this application. A source node and a fourth network device belong to a network domain 1, and a destination node and a third network device belong to a network domain 2. In this case, the fourth network device sends a third probe packet to the third network device, and a sixth domain ID list in the third probe packet includes only a domain ID corresponding to the network domain L.

It can be understood that FIG. 2, FIG. 9, and FIG. 10 are merely used as examples to understand embodiments of this application, and do not constitute any substantial limitation on this application.

802: The third network device determines a fifth domain ID list based on the sixth domain ID list.

The third network device determines the fifth domain ID list based on the sixth domain ID list, where the fifth domain ID list includes domain IDs corresponding to network domains ranging from a network domain to which the source node belongs to a network domain to which the destination node belongs.

For example, after receiving the third probe packet, the third network device adds a domain ID of the network domain to which the third network device belongs to the sixth domain ID list, to obtain the fifth domain ID list.

803: The third network device sends the fifth domain ID list to a policy decision entity.

The third network device sends the fifth domain ID list to the policy decision entity, and then the policy decision entity obtains the fifth domain ID list. Alternatively, the policy decision entity may obtain the fifth domain ID list based on the domain IDs sent by the domain controllers in the domain 1 to the domain n.

804: The policy decision entity determines, based on a policy and the fifth domain ID list, target sub-latencies corresponding to the network domains ranging from the network domain to which the source node belongs to the network domain to which the destination node belongs.

The policy decision entity determines, based on the policy and the fifth domain ID list, the target sub-latencies corresponding to the network domains ranging from the network domain to which the source node belongs to the network domain to which the destination node belongs. The policy is used to indicate to allocate target sub-latencies based on a target latency, the target latency is a needed latency of the data flow from the source node to the destination node in the TSN, and a planned latency is a maximum latency for transmitting the data flow in a network domain.

For example, the policy decision entity may determine, based on the policy and the fifth domain ID list, the target sub-latencies respectively corresponding to the network domains included in the fifth domain ID list. Optionally, the policy is user-defined, and the policy decision entity may perform, based on the policy, allocation on the target latency on average, to obtain the target sub-latencies respectively corresponding to the network domains in the fifth domain ID list. Alternatively, in a possible implementation, the fifth domain ID list further includes domain types corresponding to the domain IDs, and the policy decision entity may perform weighted allocation on the target latency based on the policy and the domain types, to obtain the target sub-latencies respectively corresponding to the network domains in the fifth domain ID list. It can be understood that in an actual case, allocation may be performed on the target latency in another allocation manner to obtain the target sub-latencies corresponding to the network domains. This is not specifically limited herein. In this implementation of this application, application scenarios of the solutions are increased.

In a possible implementation, a sum of the target sub-latencies corresponding to the network domains included in the fifth domain ID list is less than or equal to the target latency. In this implementation of this application, the sum of the target sub-latencies corresponding to the network domains included in the fifth domain ID list is less than or equal to the target latency. This reflects flexibility and selectivity of the solutions.

805: The policy decision entity sends the target sub-latencies.

The policy decision entity sends the corresponding target sub-latencies to the network devices in the network domains included in the fifth domain ID list, namely, the domain controllers. Then, the domain controllers in the network domains ranging from the network domain to which the source node belongs to the network domain to which the destination node belongs determine, based on the target sub-latencies and planned latencies corresponding to the network domains, whether reserved resources for the data flow are successfully configured. The planned latency is a maximum latency for transmitting the data flow in a network domain.

For example, in FIG. 9, the policy decision entity separately sends the corresponding target sub-latencies to the domain 1 to the domain n included in the fifth domain ID list. Optionally, the policy decision entity may send the target sub-latencies by sending corresponding policy delivery messages to the network devices in the network domains. The policy delivery messages carry corresponding target sub-latencies. For details, refer to FIG. 11. FIG. 11 is a schematic diagram of a policy delivery message according to an embodiment of this application. Optionally, the target sub-latencies and the domain IDs may be recorded in the domain ID list in a one-to-one correspondence manner. It can be understood that, alternatively, the policy delivery message may specifically carry the target sub-latency in another manner. This is not specifically limited herein.

It should be noted that, for a specific implementation in which the domain controllers in the network domains ranging from the network domain to which the source node belongs to the network domain to which the destination node belongs determine, based on the target sub-latencies and the planned latencies corresponding to the network domains, whether the reserved resources for the data flow are successfully configured, refer to the following steps 806 to 808. Steps 806 to 808 are described by using the third network device as an example.

806: The third network device obtains a corresponding planned latency based on a traffic characteristic of the data flow.

The third network device obtains the corresponding planned latency based on the traffic characteristic of the data flow. Specific content of the traffic characteristic of the data flow is similar to the traffic characteristic of the data flow described in FIG. 1. Details are not described herein again.

In a possible implementation, the traffic characteristic of the data flow is carried in the third probe packet, and/or the traffic characteristic of the data flow is sent by the policy decision entity. For example, the traffic characteristic of the data flow is carried in the third probe packet. For details, refer to FIG. 12. FIG. 12 is a schematic diagram of a third probe packet, where the third probe packet includes the traffic characteristic of the data flow and the sixth domain ID list. In addition, the traffic characteristic of the data flow is sent by the policy decision entity, that is, basic information of the data flow may be carried in the policy delivery message sent by the policy decision entity. For details, refer to FIG. 13. FIG. 13 is another schematic diagram of a policy delivery message according to an embodiment of this application. The policy delivery message includes the traffic characteristic of the data flow, the fifth domain ID list, and the target sub-latency corresponding to the network domain.

In this implementation of this application, the traffic characteristic of the data flow is carried in the third probe packet, and/or the traffic characteristic of the data flow is sent by the policy decision entity. This reflects the selectivity and flexibility of the solutions.

It should be noted that there is no specific limitation on a sequence of step 806 and any one of steps 802 to 805.

807: The third network device determines, based on the target sub-latency and the planned latency, whether a reserved resource for the data flow is successfully configured.

After obtaining the corresponding target sub-latency and the corresponding planned latency, the third network device determines, based on the target sub-latency and the planned latency, whether the reserved resource for the data flow is successfully configured.

Optionally, when the planned latency corresponding to the third network device is not greater than the target sub-latency, the third network device determines that the reserved resource for the data flow is successfully configured; or when the planned latency corresponding to the third network device is greater than the target sub-latency, the third network device determines that the reserved resource for the data flow is unsuccessfully configured. This describes a specific implementation of the solutions, and reflects reliability of the solutions.

In a possible implementation, the third network device performs step 808 specifically as follows:

808: The third network device sends a message including that a reserved state is "success" or a failed state.

When the planned latency corresponding to the third network device is not greater than the target sub-latency, the third network device sends, to the policy decision entity, the message including that the reserved state is "success", to indicate that the reserved resource for the data flow is successfully configured in the network domain to which the third network device belongs. Alternatively, when the planned latency corresponding to the third network device is greater than the target sub-latency, the third network device sends, to the policy decision entity, a message including that the reserved state is "fail", to indicate that the reserved resource for the data flow is unsuccessfully configured in the network domain to which the third network device belongs.

In this implementation of this application, the third network device sends, to the policy decision entity, the message including that the reserved state is "success" or a failed state, so that the policy decision entity determines, based on the message including that the reserved state is "success" or a failed state, whether the reserved resource for the data flow is successfully configured. This reflects the reliability of the solutions.

It should be noted that in a possible implementation, when the policy decision entity receives a message including that the reserved state is "success" that is sent by the domain controllers in the network domains included in the fifth domain ID list, the policy decision entity determines that configuration for the reserved resources for the data flow is completed in the network domains ranging from the network domain to which the source node belongs to the network domain to which the destination node belongs, and sends messages indicating that the reserved resources are successfully configured to the network domains included in the fifth domain ID list, so that the domain controllers in the network domains reserves the resources for the data flow. In this implementation of this application, the reliability and flexibility of the solutions are reflected.

In a possible implementation, the policy decision entity receives the message including that the reserved state is "fail", and then the policy decision entity further sends, based on the domain IDs in the fifth domain ID list, messages including that the reserved state is "fail" to the domain controllers in the remaining network domains, so that the domain controllers in the remaining network domains reserve no resource for the data flow.

In this implementation of this application, the policy decision entity sends the message including that the reserved state is "fail" to the domain controllers in the remaining network domains, so that the domain controllers in the network domains reserve no resource for the data flow. This reduces a waste of network resources.

It should be noted that the policy decision entity may be a domain controller in each network domain, a forwarding device in a network domain, or a network device in another network domain. This is not specifically limited herein.

In this embodiment of this application, the policy decision entity delivers the target sub-latencies to the domain controllers in the network domains ranging from the network domain to which the source node belongs to the network domain to which the destination node belongs, so that the domain controllers in the network domains determine, based on the target sub-latencies and the planned latencies corresponding to the network domains, whether the reserved resources for the data flow are successfully configured. In this way, reserved resources can be configured for inter-domain traffic, and a configuration state of the reserved resource for the data flow in each network domain can be monitored in real time, to ensure service performance of the inter-domain data flow.

It should be noted that the first network device, the second network device, the third network device, the fourth network device, or the policy decision entity may be a network device, for example, an access gateway, a controller, a switch, a server, or a terminal. This is not specifically limited herein in an actual case.

It should be noted that messages transmitted between the network devices in the TSN, such as the first message, the second message, the third message, the fourth message, a fifth message, the first probe packet, the second probe packet, the third probe packet, and the policy delivery message, may be transmitted by using an application protocol of a link-local registration protocol (LRP), for example, a controller-controller protocol (CCP) or a resource allocation protocol (RAP). It can be understood that in an actual case, the foregoing messages may be alternatively transmitted by using other protocols. This is not specifically limited herein.

Moreover, it should be noted that each of various messages and probe packets in embodiments provided in this application may be encapsulated in user data of an LRP data unit (DU) in any user-defined order, and in a form, for example, a type-length-content (TLV) form, and is transmitted, by using an edge control protocol (ECP)/transport control protocol (TCP), in an LRP application protocol database corresponding to a network device port. It can be understood that in an actual case, various types of messages and probe packets in embodiments provided in this application may be alternatively transmitted in another manner that can achieve a same objective. This is not specifically limited herein.

The foregoing details the network transmission methods provided in embodiments of this application. Specific examples are used in this specification to describe principles and implementations of this application. Descriptions of the foregoing embodiments are merely used to help understand the methods and core ideas of this application. In addition, a person of ordinary skill in the art can make modifications to the specific implementations and application scopes based on the ideas of this application. In summary, the content of this specification shall not be construed as any limitation on this application.

To implement the functions in the methods provided in the foregoing embodiments of this application, the first network device, the second network device, the third network device, the fourth network device, or the policy decision entity may include a hardware structure and/or a software module, to implement the foregoing functions by using the hardware structure, the software module, or a combination of the hardware structure and the software module. Whether a function in the foregoing functions is performed by using a hardware structure, a software module, or a combination of a hardware structure and a software module depends on particular applications and design constraints of the technical solutions.

As shown in FIG. 14, an embodiment of this application further provides a network device. The network device is applied to the internet industry. For details, refer to FIG. 14. FIG. 14 is a schematic diagram of a structure of a network device according to an embodiment of this application. In a possible implementation, the network device may include modules or units that are in a one-to-one correspondence with the methods/operations/steps/actions in the foregoing method embodiment. The units may be hardware circuits or software, or may be implemented by a hardware circuit in combination with software. In a possible implementation, the network device 1400 may include a processing unit 1402 and a sending unit 1401. The processing unit 1402 may be configured to perform the step of determining the first planned latency in the foregoing method embodiment, and may be configured to perform the step of updating the first accumulated latency in the foregoing method embodiment. The sending unit 401 may be configured to perform the step of sending the first message in the foregoing method embodiment.

In another possible design, the network device further includes a receiving unit 1403. The receiving unit 1403 is configured to receive a second message from a network domain to which a destination node belongs, where the second message indicates that a configuration state of a reserved resource for a data flow is "success".

In this embodiment of this application, the processing unit 1402 determines the first planned latency based on a traffic characteristic of the data flow, and updates the first accumulated latency based on the first planned latency; and the sending unit 401 sends the first message to a second network device when the first accumulated latency is not greater than a target latency. In addition, the receiving unit 1403 receives the second message from the network domain to which the destination node belongs, to determine that the reserved resource for the data flow is successfully configured. When the first accumulated latency is not greater than the target latency, the first message is sent to the second network device, to ensure that a domain controller in a second network domain can configure the reserved resource for the data flow based on the first message. In this way, reserved resources are configured for inter-domain traffic, to ensure quality of service of the inter-domain traffic.

In other possible designs, the processing unit 1402, the sending unit 401, and the receiving unit 1403 may perform, in a one-to-one correspondence manner, the methods/operations/steps/actions in the possible implementations of the network device in the foregoing method embodiments.

In a possible design, the processing unit 1402 is further configured to update the traffic characteristic of the data flow based on a domain type of a first network domain, where the first message further includes an updated traffic characteristic.

In a possible design, the first message further includes a first domain identifier ID list, the first domain ID list includes at least a first domain ID corresponding to the first network domain, and the first domain ID identifies the first network domain.

In a possible design, the sending unit 1401 is further configured to send a first probe packet to the second network device, where the first probe packet is used to determine a second domain ID list, the second domain ID list includes at least domain IDs corresponding to the first network domain and the second network domain, and the domain IDs identify the network domains in TSN.

In a possible design, the processing unit 1402 is further configured to reserve the resource for the data flow based on the second message.

In a possible design, the receiving unit 1403 is further configured to receive a third message from a previous network domain of the first network domain, where the third message includes the traffic characteristic of the data flow; or the processing unit 402 is further configured to determine the traffic characteristic of the data flow based on the data flow, where the network device is the source node.

In a possible design, the sending unit 401 is further configured to send the target latency to the second network device.

In a possible design, the first domain ID list further includes a domain ID corresponding to a previous network domain of the first network domain.

In a possible design, the first message further includes a first device identifier, and the first device identifier is a device identifier of a boundary device that is in the first network domain and that is connected to the second network domain.

In a possible design, the first probe packet further includes the traffic characteristic of the data flow.

For beneficial effects of the network device in the foregoing designs of this application, refer to the beneficial effects of the implementations in the method embodiment in FIG. 1 in a one-to-one correspondence with the beneficial effects of the network device. Details are not described herein again.

It should be noted that content such as information exchange and execution processes between the modules/units in the network device in the embodiment corresponding to FIG. 14 is based on a same concept as related content of the first network device in the method embodiment corresponding to FIG. 1 in this application. For specific content, refer to the descriptions in the foregoing method embodiment of this application. Details are not described herein again.

As shown in FIG. 15, an embodiment of this application further provides a network device. The network device is applied to the internet industry. For details, refer to FIG. 15. FIG. 15 is another schematic diagram of a structure of a network device according to an embodiment of this application. In a possible implementation, the network device may include modules or units that are in a one-to-one correspondence with the methods/operations/steps/actions in the foregoing method embodiments. The units may be hardware circuits or software, or may be implemented by a hardware circuit in combination with software. In a possible implementation, the network device 1500 may include a receiving unit 1501 and a processing unit 1502. The receiving unit 1501 may be configured to perform the step of receiving the fourth message sent by the fourth network device in the foregoing method embodiment. The processing unit 1502 may be configured to perform the step of determining the third planned latency in the foregoing method embodiment, may be configured to perform the step of updating the first accumulated latency in the foregoing method embodiment, and may be further configured to perform the step of determining, based on the first accumulated latency and the target latency, whether the reserved resource for the data flow is successfully configured in the foregoing method embodiment.

In another possible design, the network device further includes a sending unit 1503. The sending unit 1503 is configured to: when the first accumulated latency is not greater than the target latency, send a second message, where the second message indicates that a configuration state of the reserved resource for the data flow is "success".

In this embodiment of this application, the receiving unit 1501 receives the fourth message sent by the fourth network device; the processing unit 1502 determines the third planned latency based on a traffic characteristic of the data flow; the processing unit 1502 updates the first accumulated latency based on the third planned latency; and the processing unit 1502 further determines, based on the first accumulated latency and the target latency, whether the reserved resource for the data flow is successfully configured. In addition, in a possible design, when the first accumulated latency is not greater than the target latency, the sending unit 1503 sends the second message, to determine that the reserved resource for the data flow is successfully configured. The third network device belongs to a same network domain as a destination node. In this case, the third network device obtains an ultimate first accumulated latency, and determines, based on the first accumulated latency and the target latency, whether the reserved resource for the data flow is successfully configured. In this way, reserved resources are configured for inter-domain traffic, to ensure quality of service of the inter-domain traffic.

In other possible designs, the receiving unit 1501, the processing unit 1502, and the sending unit 1503 may perform, in a one-to-one correspondence manner, the methods/operations/steps/actions in the possible implementations of the network device in the foregoing method embodiments.

In a possible design, the processing unit 1502 is specifically configured to: when the first accumulated latency is not greater than the target latency, determine that the reserved resource for the data flow is successfully configured; or when the first accumulated latency is greater than the target latency, determine that the reserved resource for the data flow is unsuccessfully configured.

In a possible design, the traffic characteristic of the data flow is obtained by the fourth network device based on a domain type of a previous network domain; or the traffic characteristic of the data flow is obtained by the fourth network device based on the data flow.

In a possible design, the fourth message further includes a third domain ID list, the third domain ID list includes domain IDs corresponding to network domains through which the data flow passes, and the domain IDs identify the network domains in TSN.

In a possible design, the receiving unit 1501 is further configured to receive a second probe packet sent by the fourth network device, where the second probe packet is used to determine a fourth domain ID list, the fourth domain ID list includes domain IDs corresponding to network domains ranging from a network domain to which a source node belongs to the network domain to which the destination node belongs, and the domain IDs identify the network domains in the TSN.

In a possible design, the sending unit 1503 is specifically configured to send the second message to network devices in corresponding network domains based on the third domain ID list or the fourth domain ID list.

In a possible design, the fourth message further includes a second device identifier, and the second device identifier is a device identifier of a boundary device that is in the network domain to which the fourth network device belongs and that is connected to the third network domain.

For beneficial effects of the network device in the foregoing designs of this application, refer to the beneficial effects of the implementations in the method embodiment in FIG. 1 in a one-to-one correspondence with the beneficial effects of the network device. Details are not described herein again.

It should be noted that content such as information exchange and execution processes between the modules/units in the network device in the embodiment corresponding to FIG. 15 is based on a same concept as related content of the third network device in the method embodiment corresponding to FIG. 1 in this application. For specific content, refer to the descriptions in the foregoing method embodiment of this application. Details are not described herein again.

An embodiment of this application further provides a network device. The network device is applied to the internet industry, and is configured to implement functions of the third network device in FIG. 8. In a possible implementation, the network device may include modules or units that are in a one-to-one correspondence with the methods/operations/steps/actions in the foregoing method embodiments. The units may be hardware circuits or software, or may be implemented by a hardware circuit in combination with software. A specific design is based on a same concept as that of the third network device in the method embodiment corresponding to FIG. 8 in this application. For specific content, refer to the descriptions in the foregoing method embodiment of this application. Details are not described herein again.

An embodiment of this application further provides a network device. The network device is applied to the internet industry, and is configured to implement functions of the policy decision entity in FIG. 8. In a possible implementation, the network device may include modules or units that are in a one-to-one correspondence with the methods/operations/steps/actions in the foregoing method embodiments. The units may be hardware circuits or software, or may be implemented by a hardware circuit in combination with software. A specific design is based on a same concept as that of the policy decision entity in the method embodiment corresponding to FIG. 8 in this application. For specific content, refer to the descriptions in the foregoing method embodiment of this application. Details are not described herein again.

In addition, functional modules or units in embodiments of this application may be integrated into one processor, each of the modules or units may exist alone physically, or at least two or modules or units may be integrated into one module or unit. The integrated module or unit may be implemented in a form of hardware, or may be implemented in a form of a software functional module.

Figure 16:
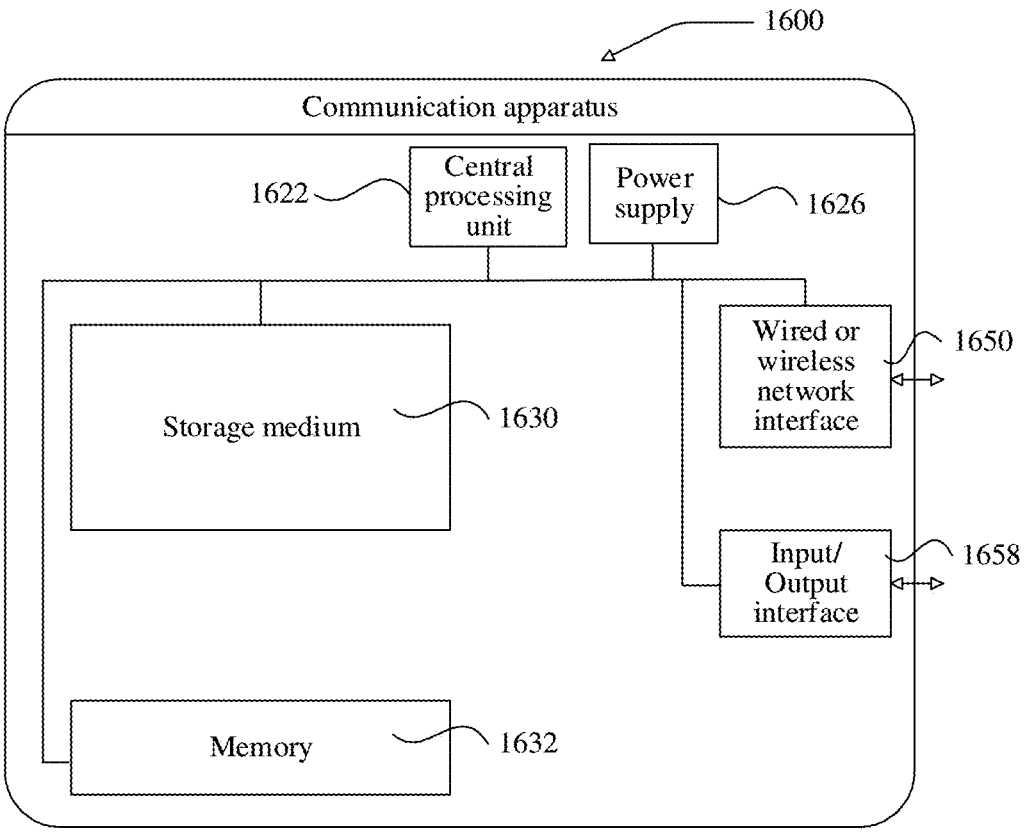
FIG. 16 is a schematic diagram of a structure of a communication apparatus according to an embodiment of this application.

The following describes a communication apparatus according to an embodiment of this application. FIG. 16 is a schematic diagram of a structure of a communication apparatus according to an embodiment of this application. The communication apparatus 1600 may be the network device or the policy decision entity in the embodiment corresponding to FIG. 1 or FIG. 8, and is configured to implement functions of the network devices in FIG. 14 and FIG. 15 and the third network device or the policy decision entity in FIG. 8. Specifically, the communication apparatus 1600 is implemented by one or more servers. The communication apparatus 1600 may vary greatly due to different configurations or performance, and may include one or more central processing units (CPU) 1622 (for example, one or more central processing units), a memory 1632, and one or more storage media 1630 (for example, one or more storage devices). The memory 1632 and the storage medium 1630 may be temporary storage or persistent storage. A program stored in the storage medium 1630 may include one or more modules (not shown in the figure), where each module may include a series of instruction operations for the communication apparatus 1600. Further, the central processing unit 1622 may be configured to communicate with the storage medium 1630, and execute, in the communication apparatus 1600, the series of instruction operations in the storage medium 1630.

The communication apparatus 1600 may further include one or more power supplies 1626, one or more wired or wireless network interfaces 1650, and/or one or more input/output interfaces 1658.

In this embodiment of this application, the central processing unit 1622 is configured to perform the method in the embodiment corresponding to FIG. 1 or FIG. 8. For example, the central processing unit 1622 may be configured to: determine a first planned latency based on a traffic characteristic of a data flow; update a first accumulated latency based on the first planned latency; and when the first accumulated latency is not greater than a target latency, send a first message to a second network device.

It should be noted that the central processing unit 1622 may be further configured to perform any step in the method embodiment corresponding to FIG. 1 or FIG. 8 in this application. For specific content, refer to the descriptions in the foregoing method embodiments of this application. Details are not described herein again.

An embodiment of this application further provides another communication apparatus, including a processor. The processor is coupled to a memory, the memory stores instructions, and the processor is configured to execute the instructions, so that the communication apparatus performs any one of the implementations described in the foregoing method embodiments.

An embodiment of this application further provides a computer-readable storage medium, including computer-readable instructions. When the computer-readable instructions are run on a computer, the computer is enabled to perform any one of the implementations described in the foregoing method embodiments.

An embodiment of this application further provides a computer program product. The computer program product includes a computer program or instructions. When the computer program or instructions are run on a computer, the computer is enabled to perform any one of the implementations described in the foregoing method embodiments.

This application further provides a chip or a chip system. The chip may include a processor. The chip may further include a memory (or a storage module) and/or a transceiver (or a communication module), or the chip is coupled to a memory (or a storage module) and/or a transceiver (or a communication module). The transceiver (or the communication module) may be configured to support the chip in performing wired and/or wireless communication. The memory (or the storage module) may be configured to store a program or a group of instructions. The processor may invoke the program or the group of instructions to implement operations performed by the terminal or the network device in the foregoing method embodiments or any one of the possible implementations of the method embodiments. The chip system may include the chip, or may include the chip and other discrete devices, such as a memory (or a storage module) and/or a transceiver (or a communication module).

In addition, it should be noted that the apparatus embodiments described above are merely examples. The units described as separate parts may or may not be physically separate, and parts displayed as units may or may not be physical units, may be located in one position, or may be distributed on a plurality of network units. Some or all of the modules may be selected depending on an actual requirement to achieve the objectives of the solutions in embodiments. Moreover, in the accompanying drawings of the apparatus embodiments provided in this application, connection relationships between modules indicate that the modules have communication connections with each other, which may be specifically implemented as one or more communication buses or signal cables.

Based on the descriptions of the foregoing implementations, a person skilled in the art can clearly understand that this application may be implemented by software in addition to necessary commodity hardware, and certainly may be alternatively implemented by dedicated hardware, including a dedicated integrated circuit, a dedicated CPU, a dedicated memory, a dedicated component, and the like. Generally, any function implemented by a computer program can be easily implemented by using corresponding hardware. Moreover, specific hardware structures used to achieve a same function may be of various forms, for example, in forms of an analog circuit, a digital circuit, and a dedicated circuit. However, as for this application, a software program implementation is a better implementation in most cases. Based on such an understanding, the technical solutions of this application essentially or the part contributing to the conventional technology may be implemented in a form of a software product. The computer software product is stored in a readable storage medium, for example, a floppy disk, a USB flash drive, a removable hard disk, a read-only memory (ROM), a random access memory (RAM), a magnetic disk, or an optical disc of a computer, and includes several instructions for instructing a computer device (which may be a personal computer, a training device, a network device, or the like) to perform the methods in embodiments of this application.

All or some of the foregoing embodiments may be implemented by using software, hardware, firmware, or any combination thereof. When software is used to implement the foregoing embodiments, all or some of the foregoing embodiments may be implemented in a form of a computer program product.

The computer program product includes one or more computer instructions. When the computer program instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, training device, or data center to another website, computer, training device, or data center in a wired (for example, a coaxial cable, an optical fiber, or a digital subscriber line) or wireless (for example, infrared, radio, or microwave) manner. The computer-readable storage medium may be any usable medium accessible to a computer, or a data storage device, for example, a training device or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

What is claimed is:

1. A method, comprising:

determining, by a first network device, a first planned latency based on a traffic characteristic of a data flow, wherein the first planned latency is a maximum latency for transmitting the data flow in a first network domain, and the first network domain is a network domain in time-sensitive networking (TSN);

updating, by the first network device, a first accumulated latency based on the first planned latency, wherein the first accumulated latency is a maximum accumulated latency of the data flow from a source node to a destination node in the TSN, and the source node and the destination node belong to different network domains in the TSN; and based on that the first accumulated latency is not greater than a target latency, sending, by the first network device, a first message to a second network device, wherein the first message indicates the first accumulated latency, the target latency is a needed latency of the data flow from the source node to the destination node in the TSN, the second network device belongs to a second network domain in the TSN, and the second network domain is a next network domain of the first network domain.

2. The method according to claim 1, wherein before the sending, by the first network device, the first message to the second network device, the method further comprises:

updating, by the first network device, the traffic characteristic of the data flow based on a domain type of the first network domain, wherein the first message further indicates an updated traffic characteristic.

3. The method according to claim 1, wherein the first message further indicates a first domain identifier (ID) list, the first domain ID list comprises at least a first domain ID corresponding to the first network domain, and the first domain ID identifies the first network domain.

4. The method according to claim 1, wherein before the sending, by the first network device, the first message to the second network device, the method further comprises:

sending, by the first network device, a first probe packet to the second network device, wherein the first probe packet is used to determine a second domain ID list, the second domain ID list comprises at least domain IDs corresponding to the first network domain and the second network domain, and the domain IDs identify network domains in the TSN.

5. The method according to claim 1, wherein the method further comprises:

receiving, by the first network device, a second message from a network domain to which the destination node belongs, wherein the second message indicates that a configuration state of a reserved resource for the data flow is "success"; and reserving, by the first network device, the reserved resource for the data flow based on the second message.

6. The method according to claim 1, wherein before the determining, by the first network device, the first planned latency based on the traffic characteristic of the data flow, the method further comprises:

receiving, by the first network device, a third message from a previous network domain of the first network domain, wherein the third message comprises the traffic characteristic of the data flow; or determining, by the first network device, the traffic characteristic of the data flow based on the data flow, wherein the first network device is the source node.

7. The method according to claim 1, wherein the method further comprises:

sending, by the first network device, the target latency to the second network device.

8. The method according to claim 3, wherein the first domain ID list further comprises a domain ID corresponding to a previous network domain of the first network domain.

9. The method according to claim 1, wherein the first message further indicates a first device identifier of a boundary device that is in the first network domain and that is connected to the second network domain.

10. The method according to claim 4, wherein the first probe packet further indicates the traffic characteristic of the data flow.

11. A network device, wherein the network device comprises:

a non-transitory memory storing instructions; and at least one processor coupled to the non-transitory memory; wherein the instructions, when executed by the at least one processor, cause the network device to perform operations including:

determining a first planned latency based on a traffic characteristic of a data flow, wherein the first planned latency is a maximum latency for transmitting the data flow in a first network domain, and the first network domain is a network domain in time-sensitive networking (TSN);

updating a first accumulated latency based on the first planned latency, wherein the first accumulated latency is a maximum accumulated latency of the data flow from a source node to a destination node in the TSN, and the source node and the destination node belong to different network domains in the TSN; and based on that the first accumulated latency is not greater than a target latency, sending a first message to a second network device, wherein the first message indicates the first accumulated latency, the target latency is a needed latency of the data flow from the source node to the destination node in the TSN, the second network device belongs to a second network domain in the TSN, and the second network domain is a next network domain of the first network domain.

12. The network device according to claim 11, before the sending the first message to the second network device, the operations further comprising:

updating the traffic characteristic of the data flow based on a domain type of the first network domain, wherein the first message further indicates an updated traffic characteristic.

13. The network device according to claim 11, wherein the first message further indicates a first domain identifier (ID) list, the first domain ID list comprises at least a first domain ID corresponding to the first network domain, and the first domain ID identifies the first network domain.

14. The network device according to claim 11, before the sending the first message to the second network device, the operations further comprising:

sending a first probe packet to the second network device, wherein the first probe packet is used to determine a second domain ID list, the second domain ID list comprises at least domain IDs corresponding to the first network domain and the second network domain, and the domain IDs identify network domains in the TSN.

15. The network device according to claim 11, the operations further comprising:

receiving a second message from a network domain to which the destination node belongs, wherein the second message indicates that a configuration state of a reserved resource for the data flow is "success"; and reserving the reserved resource for the data flow based on the second message.

16. A network device, wherein the network device comprises:

a non-transitory memory storing instructions; and at least one processor coupled to the non-transitory memory; wherein the instructions, when executed by the at least one processor, cause the network device to perform operations including:

receiving a fourth message from a fourth network device, wherein the fourth message indicates a first accumulated latency and a traffic characteristic of a data flow, the first accumulated latency is a maximum accumulated latency of the data flow from a source node to a destination node in time-sensitive networking (TSN), the source node and the destination node belong to different network domains in the TSN, the network device and the destination node belong to a third network domain in the TSN, and the fourth network device belongs to a previous network domain of the third network domain;

determining a third planned latency based on the traffic characteristic of the data flow, wherein the third planned latency is a maximum latency for transmitting the data flow in the third network domain;

updating the first accumulated latency based on the third planned latency; and determining, based on the first accumulated latency and a target latency, whether a reserved resource for the data flow is successfully configured, wherein the target latency is a needed latency of the data flow from the source node to the destination node in the TSN.

17. The network device according to claim 16, the determining whether the reserved resource for the data flow is successfully configured comprising:

when the first accumulated latency is not greater than the target latency, determining that the reserved resource for the data flow is successfully configured; or when the first accumulated latency is greater than the target latency, determining that the reserved resource for the data flow is unsuccessfully configured.

18. The network device according to claim 16, wherein the traffic characteristic of the data flow is obtained by the fourth network device based on a domain type of the previous network domain; or wherein the traffic characteristic of the data flow is obtained by the fourth network device based on the data flow.

19. The network device according to claim 16, wherein the fourth message further indicates a third domain ID list, the third domain ID list comprises domain IDs corresponding to network domains through which the data flow passes, and the domain IDs identify network domains in the TSN.

20. The network device according to claim 16, the operations further comprising:

receiving a second probe packet sent by the fourth network device, wherein the second probe packet is used to determine a fourth domain ID list, the fourth domain ID list comprises domain IDs corresponding to network domains ranging from a network domain to which the source node belongs to a network domain to which the destination node belongs, and the domain IDs identify network domains in the TSN.

* * * * *